(12) United States Patent
Yoo

(10) Patent No.: US 12,354,080 B2
(45) Date of Patent: Jul. 8, 2025

(54) METHOD, PROGRAM, AND SYSTEM FOR PROVIDING FINANCIAL TRANSACTION BASED ON A VIRTUAL CORPORATE CARD

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 191 days.

(21) Appl. No.: 17/680,257

(22) Filed: Feb. 24, 2022

(65) Prior Publication Data

US 2022/0180354 A1    Jun. 9, 2022

Related U.S. Application Data

(63) Continuation of application No. PCT/KR2020/011552, filed on Aug. 28, 2020.

(30) Foreign Application Priority Data

Aug. 30, 2019 (KR) .................. 10-2019-0107065
Aug. 28, 2020 (KR) .................. 10-2020-0109175

(51) Int. Cl.
| | | |
|---|---|---|
| G06Q 30/00 | (2023.01) | |
| G06Q 20/10 | (2012.01) | |
| G06Q 20/34 | (2012.01) | |
| G06Q 20/40 | (2012.01) | |
| G06Q 40/12 | (2023.01) | |

(52) U.S. Cl.
CPC ......... *G06Q 20/351* (2013.01); *G06Q 20/102* (2013.01); *G06Q 20/4014* (2013.01); *G06Q 20/405* (2013.01); *G06Q 40/12* (2013.12)

(58) Field of Classification Search
USPC ....... 705/35, 39, 1.1, 75; 235/375, 379, 380; 455/558
See application file for complete search history.

(56) References Cited

U.S. PATENT DOCUMENTS

| | | | |
|---|---|---|---|
| 2012/0310815 A1 | 12/2012 | Reich et al. | |
| 2015/0134540 A1* | 5/2015 | Law ..................... | G06Q 20/385 705/72 |
| 2016/0335634 A1* | 11/2016 | Flood ................... | G06Q 20/409 |
| 2019/0156338 A1 | 5/2019 | Salama et al. | |
| 2020/0320526 A1 | 10/2020 | Yoo | |
| 2020/0410476 A1 | 12/2020 | Yoo | |

(Continued)

FOREIGN PATENT DOCUMENTS

| | | | | |
|---|---|---|---|---|
| JP | 2017-033190 A | 2/2017 | | |
| KR | 543150 A * | 11/2003 | ............. | G06Q 40/02 |

(Continued)

OTHER PUBLICATIONS ip.com NPL Search History.*

(Continued)

*Primary Examiner* — John H. Holly
(74) *Attorney, Agent, or Firm* — Studebaker Brackett PLLC

(57) ABSTRACT

Embodiments of the inventive concept provide a method, program, and system for providing a virtual corporate card-based financial transaction that may reduce the issuance of unnecessary physical corporate cards and may conveniently and quickly manage the issuance and management of corporate cards in real time.

13 Claims, 12 Drawing Sheets

(56) References Cited

U.S. PATENT DOCUMENTS

2021/0157931 A1   5/2021  Yoo
2021/0185034 A1   6/2021  Yoo

FOREIGN PATENT DOCUMENTS

| KR | 10-1316466 B1 | 10/2013 |
| KR | 10-2016-0036471 A | 4/2016 |
| KR | 10-2016-0110704 A | 9/2016 |
| KR | 10-2019-0016878 A | 2/2019 |
| KR | 10-2019-0055039 A | 5/2019 |
| KR | 10-2005549 B1 | 7/2019 |
| KR | 102005554 B1 | 7/2019 |
| KR | 10-2020-0097655 A | 8/2020 |

OTHER PUBLICATIONS

International Search Report issued in PCT/KR2020/011552; mailed Dec. 4, 2020.
The extended European search report issued by the European Patent Office on Aug. 3, 2023, which corresponds to European Patent Application No. 20857354.3-1218 and is related to U.S. Appl. No. 17/680,257.

\* cited by examiner

METHOD, PROGRAM, AND SYSTEM FOR PROVIDING FINANCIAL TRANSACTION BASED ON A VIRTUAL CORPORATE CARD

CROSS-REFERENCE TO RELATED APPLICATIONS

The present application is a continuation of International Patent Application No. PCT/KR2020/011552, filed on Aug. 28, 2020, which is based upon and claims the benefit of priority to Korean Patent Application No. 10-2019-0107065 filed on Aug. 30, 2019 and Korean Patent Application No. 10-2020-0109175 filed on Aug. 28, 2020. The disclosures of the above-listed applications are hereby incorporated by reference herein in their entirety.

BACKGROUND

1. Technical Field

Embodiments of the inventive concept described herein relate to a method, program, and system for providing financial transaction a virtual corporate card.

2. Description of Related Art

A corporate card is a card issued to a corporation and is a card that is capable of increasing the use clearness of expenses of the corporation and is required to be used in accordance with the tax law.

Generally, the corporate card is managed for each employee or organization by a manager in the corporation; and a card issuer issues a card, of which the card number is assigned to each target (employee or organization).

Code-type data is being used in a lot of fields. In addition to a card number or account number used to make a payment, the code-type data includes an IPIN number, a resident registration number, or the like for user identification.

However, the code data may be leaked when the code data is used. In the case of a card number, because an actual card number is recorded on a card surface as it is, the actual card number is visually exposed to other people. When a payment using a magnet is made, the card number is leaked to other people while being transmitted to a POS device.

A virtual code has been used to prevent the actual code from being leaked. However, there is a need for data for identifying a user to search for the actual code corresponding to the virtual code. For example, a code of one-time-password (OTP) is changed and generated every time. However, a login procedure is needed to determine an algorithm assigned to the user, and thus it is difficult for OTP to be applied to various fields.

There is a prior art disclosed as Korean Registered Patent No. 10-1316466 (Patent document 0001) on Oct. 1, 2013.

SUMMARY

In general, a conventional corporate card management method issues and collects a plurality of actual corporate cards, which are received from financial companies, to employees if necessary.

Embodiments of the inventive concept provide a method, program, and system for providing a virtual corporate card-based financial transaction that may reduce the issuance of unnecessary physical corporate cards and may conveniently and quickly manage the issuance and management of corporate cards in real time.

Furthermore, embodiments of the inventive concept provide a method, program, and system for providing virtual corporate card-based financial transaction that may allow an actual corporate card number not to be exposed to the outside and may verify the validity of an employee-specific virtual corporate card number to make a payment when a financial transaction is made with a virtual corporate card.

Besides, embodiments of the inventive concept provide a method, program, and system that allow a manager to use a virtual corporate card under limited conditions.

Moreover, embodiments of the inventive concept provide a method, program, and system for providing a virtual corporate card-based financial transaction that is capable of being used by adding only an algorithm without changing a conventional payment process.

Problems to be solved by the inventive concept are not limited to the problems mentioned above, and other problems not mentioned will be clearly understood by those skilled in the art from the following description.

According to an embodiment, a method for providing financial transaction a virtual corporate card includes receiving, by a server, an employee-specific virtual corporate card number or searching for an employee-specific virtual corporate card number thus stored previously, the employee-specific virtual corporate card number being generated by a virtual corporate card number generation function included in a manager application registered in the server, searching, by the server, for a storage location of company identification (CID) based on the employee-specific virtual corporate card number, extracting, by the server, a corporate card usage condition stored after matching the found storage location of the CID or a corporate card usage condition included in the employee-specific virtual corporate card number, verifying, by the server, the employee-specific virtual corporate card number, and making, by the server, a payment with an actual corporate card number or a representative-specific virtual corporate card number, which is stored after matching the storage location of the CID under the corporate card usage condition.

In an embodiment, the receiving of the employee-specific virtual corporate card number may include receiving, by the server, a virtual employee card number, wherein the virtual employee card number is generated by a virtual corporate card number generation function included in an employee application registered in the server, searching, by the server, for a storage location of user identification (UID) based on the virtual employee card number, and extracting, by the server, the employee-specific virtual corporate card number stored after matching the storage location of the UID.

In an embodiment, the method may further include receiving, by the server, the corporate card usage condition matching the UID before the receiving of the employee-specific virtual corporate card number and matching and storing, by the server, the corporate card usage condition with the UID.

In an embodiment, the making of the payment may include extracting, by the server, the corporate card usage condition stored after matching the UID. The server may determine whether to make a payment, under the corporate card usage condition.

In an embodiment, the corporate card usage condition may include information about a card available time. The server may make a payment when a point in time when the virtual employee card number or the employee-specific virtual corporate card number is received is within the card available time.

In an embodiment, the verifying of the employee-specific virtual corporate card number may include determining, by the server, the virtual employee card number or the employee-specific virtual corporate card number as a normal card number when the information about the card available time is stored after matching the UID when the point in time when the virtual employee card number or the employee-specific virtual corporate card number is received is within a time zone corresponding to the information about the card available time.

In an embodiment, the corporate card usage condition may be included in the employee-specific virtual corporate card number.

In an embodiment, when the corporate card usage condition is extracted from the employee-specific virtual corporate card number, the server may make a payment under the extracted corporate card usage condition.

In an embodiment, the employee-specific virtual corporate card number and the virtual employee card number may include identifier numbers different from each other. The server may search for the storage location of the UID or the storage location of the CID by using different search algorithms depending on an identifier number included in a card number thus received.

According to an embodiment, a program providing a financial transaction by using a virtual corporate card number is stored in a medium in combination with a computer, which is hardware, to perform the method.

According to an embodiment, a server for providing a financial transaction includes a virtual corporate card number acquisition unit that receives an employee-specific virtual corporate card number or searches for an employee-specific virtual corporate card number thus stored previously, a search unit that searches for a storage location of CID based on the employee-specific virtual corporate card number, and a payment execution unit that extracts a corporate card usage condition stored after matching the storage location of the CID or a corporate card usage condition included in the employee-specific virtual corporate card number, verifies the employee-specific virtual corporate card number, and makes a payment with an actual corporate card number or a representative-specific virtual corporate card number, which is stored after matching the storage location of the CID under the corporate card usage condition.

In an embodiment, the search unit may receive a virtual employee card number and may search for a storage location of UID based on the virtual employee card number. The virtual corporate card number acquisition unit may extract the employee-specific virtual corporate card number stored after matching the storage location of the UID.

In an embodiment, the server may receive the corporate card usage condition matching the UID, and may match and store the corporate card usage condition with the UID.

In an embodiment, the payment execution unit may extract the corporate card usage condition stored after matching the UID, and may determine whether to make a payment, under the corporate card usage condition.

In an embodiment, the corporate card usage condition may include information about a card available time. The payment execution unit may make a payment when a point in time when the virtual employee card number or the employee-specific virtual corporate card number is received is within the card available time.

Other details according to an embodiment of the inventive concept are included in the detailed description and drawings.

DETAILED DESCRIPTION

Figure 1:
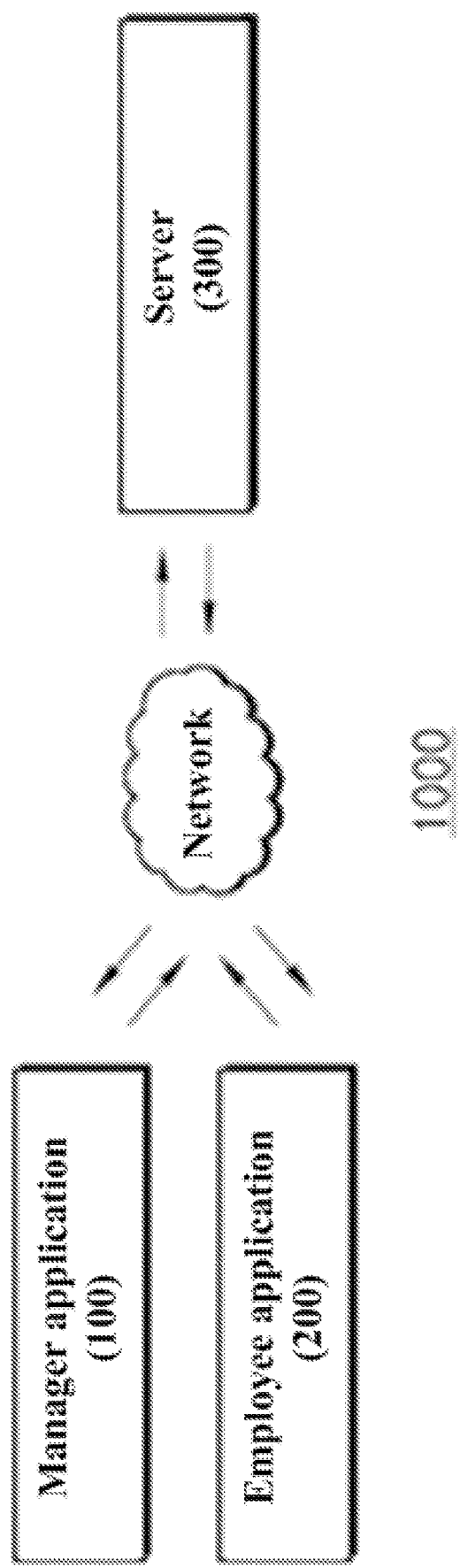
FIG. 1 is a block diagram of a system providing a financial transaction based on a virtual corporate card, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

In this specification, a "corporate card" refers to a card for handling expenses of an organization such as a corporation. That is, the "corporate card" includes not only a card issued by a financial company to the corporation, but also a card issued by an oil refiner to a corporation to make a payment. Also, even though it is referred to as a corporate card, the subject of the corporate card is not limited to a corporation, but includes any organization composed of a plurality of members.

In this specification, a "character" is a component constituting a code and includes all or part of uppercase alphabet characters, lowercase alphabet characters, numerals, and special characters.

In this specification, a "code" refers to a string of characters.

In this specification, "user identification (UID)" refers to a unique code-type value assigned without redundancy for each user to identify a user.

In this specification, "company identification (CID)" refers to a unique code-type value assigned without redundancy for each organization to identify an organization such as a corporation.

In this specification, an 'actual corporate card number' is the number assigned to an actual corporate card issued by a financial company or a card company, and means an actual card number for a corporation assigned to a general physical card, a mobile card, and the like.

In the present specification, a "corporate representative-specific virtual corporate card number" is used to replace an actual corporate card number of a specific corporation. For example, the "corporate representative-specific virtual corporate card number" may be used to prepare for leakage problems that occur by providing the actual corporate card number to an external server. The "corporate representative-specific virtual corporate card number" may be issued directly from a financial company server (i.e., a payment server) or may be issued to correspond to the actual corporate card number from a server of a payment network used by a financial company.

In this specification, an "employee-specific virtual corporate card number" refers to a corporation-specific virtual card number that is generated by a manager application and is used to search for an actual corporate card number (or a corporate representative-specific virtual corporate card number) or to search for a CID.

In this specification, the "virtual employee card number" refers to a temporary card number that is generated by an employee application or a financial transaction service through which an employee has registered the virtual corporate card number, and is used to search for a virtual corporate card number or to search for a UID. Both the above-mentioned virtual corporate card number and the above-mentioned temporary corporate card may be virtual corporate card numbers but may have different names depending on the subject that generates the virtual corporate card number and the temporary corporate card. The two kinds of virtual corporate card numbers are generated by different seed data and different corporate card number generation functions.

In this specification, a "variable virtual employee card number" is a virtual card number used to make an online or offline payment while being changed and created every unit time by an employee application (i.e., an application for a corporate card). The variable virtual employee card number is used to search for the employee-specific virtual corporate card number assigned to each employee.

In this specification, a "fixed virtual employee card number" is a virtual card number included in a wearable device (including an empty card) registered by an employee and is stored after matching the employee-specific virtual corporate card number through an employee registration process. In other words, the "fixed virtual employee card number" is delivered through a payment network during an offline payment without being exposed to the outside and is used to search for an employee-specific virtual corporate card number.

In this specification, a "user terminal" is any electronic device including an application processor (AP) capable of driving an application. The user terminal includes a non-portable desktop computer or a portable mobile device (e.g., a smart phone, a tablet PC, a personal digital assistant (PDA), an enterprise digital assistant (EDA), a portable multimedia player (PMP), a personal navigation device (PND), a wearable device, or the like), but is not limited thereto.

In this specification, a "wearable device" means a device capable of being used or carried by being attached to or worn on a body. As a specific example, the wearable device may be implemented in various shapes such as an empty card, a smart watch, watches, bracelets, anklets, rings, necklaces, glasses, shoes, clothing, or the like, but is not limited thereto. The wearable device includes any shape capable of being attached to or worn on a body.

In this specification, the "empty card" is a separate card that is distinguished from a user's actual card, and refers to a card not connected to a specific financial company or payment company. In the meantime, a separate empty card number or an identification number (e.g., serial number) may be assigned to the empty card.

In this specification, an "employee-specific virtual corporate card number generation condition" means a condition for generating a virtual corporate card number of the corresponding corporation set for each manager application by a server. For example, the employee-specific virtual corporate card number generation condition may be assigned to a manager application in a form of a virtual corporate card number generation algorithm.

In this specification, a "virtual employee card number generation condition" means a condition for generating a virtual corporate card number of the corresponding corporation set for each employee application by the server. However, when the virtual employee card number is created in the financial transaction service where the employee registered the virtual corporate card number, the virtual employee card number generation condition is not set by a server.

In this specification, a "corporate card usage condition" means a condition for restricting the use of a virtual corporate card number issued to an employee. For example, the individual virtual corporate card number usage condition may include, but is not limited to, information about expiration date, usage limitations, affiliated stores to be used, and the like.

In this specification, "making a payment" means that a server may transmit an actual corporate card number or a representative-specific virtual corporate card number stored in the server to the outside in response to a payment request such that a financial transaction is capable of being made.

Hereinafter, an embodiment of the inventive concept will be described in detail with reference to the accompanying drawings.

FIG. 1 is a block diagram of a system 1000 providing a financial transaction based on a virtual corporate card, according to an embodiment of the inventive concept.

Referring to FIG. 1, according to an embodiment of the inventive concept, a system 1000 providing a financial transaction based on a virtual corporate card may include a manager application 100, an employee application 200, and a server 300.

The manager application 100 is an application provided to a corporate card manager when a corporate card is issued by a financial company. When making a request for issuance of a corporate card to the financial company, the manager application 100 may be activated to a corporate card manager by the server 300.

The manager application 100 may issue and manage a virtual corporate card for employees by generating an employee-specific virtual corporate card number to provide the virtual corporate card number to the employee application 200. At this time, the manager application 100 may generate the employee-specific virtual corporate card number to transmit the virtual corporate card number directly to the employee application 200 or to provide the virtual corporate card number to the employee application 200 through an in-house system. However, an embodiment is not limited thereto. For example, the manager application 100 may generate an employee-specific virtual corporate card number corresponding to the specific employee application 200, and may register the generated employee-specific virtual corporate card number in only the server 300. Furthermore, the manager application 100 may not transmit the generated employee-specific virtual corporate card number to the employee application 200. The employee application 200 may generate a virtual employee card number by using the UID registered in the server 300 as seed data and may request a payment by using the generated virtual employee card number. As described above, security may be improved because the employee-specific virtual corporate card number is not transmitted to an employee terminal.

Moreover, the manager application 100 may set a corporate card usage condition (e.g., the expiration date of a corporate card, usage limitations of a corporate card, or the like) for the issued employee-specific virtual corporate card number. The corporate card usage condition may be transmitted to the server 300 through the manager application 100. Afterward, the corporate card usage condition may be registered in the server 300 or may be included in the employee-specific virtual corporate card number and then may be transmitted to the server 300. This will be described later.

The manager application 100 may include a virtual corporate card number generation function, which is a function used to generate an employee-specific virtual corporate card number. In this case, the manager application 100 generates the employee-specific virtual corporate card number by using a pre-stored virtual corporate card number generation function without the communication with the outside of the server 300. That is, the manager application 100 does not receive separate seed data from the outside in a process of generating an employee-specific virtual corporate card number, thereby enhancing security. In addition, a payment may be made even though the communication with the outside is restricted.

Meanwhile, the employee-specific virtual corporate card number is generated not to be duplicated with another employee-specific virtual corporate card number. As a specific example, the employee-specific virtual corporate card number may be generated based on time data (e.g., the length of time elapsed from the time of installation or registration) corresponding to a point in time when the virtual card number is requested. Accordingly, the manager application 100 may generate different employee-specific virtual corporate card numbers depending on a generation time point, and the employee-specific virtual corporate card number generated at a specific time point is not duplicated with the employee-specific virtual corporate card number generated at another time point.

In an embodiment, the virtual corporate card number generation function may include a detailed code generation function and a detailed code combination function. That is, the employee-specific virtual corporate card number may be generated by combining a plurality of detailed codes.

In an embodiment, the manager application 100 includes a virtual corporate card number generation function, and generates an employee-specific virtual corporate card number by using CID. In detail, the manager application 100 generates an employee-specific virtual corporate card number by using the CID as seed data of the virtual corporate card number generation function. However, an embodiment is not limited thereto. The manager application 100 may generate an employee-specific virtual corporate card number by using a unique value of the manager application 100 or a unique value of the terminal, in which the manager application 100 is installed, as seed data. In this specification, the CID described above may be replaced with the unique value of the manager application 100 or the unique value of the terminal in which the manager application 100 is installed.

In the meantime, the manager application 100 needs to be registered in the server 300. That is, a manager installs the manager application 100 in a user terminal, and the manager application 100 transmits the CID to the server 300 such that the server 300 registers the CID. However, an embodiment is not limited thereto. For example, the manager application 100 may be a program installed in a user terminal upon release from a factory.

For example, the manager application 100 may receive the CID from the manager during registration or may generate manager information based on login information of the manager application 100 of the manager. Here, the manager information may include at least one of a CID, a corporate name, a unique value of the manager application, and a unique value of a terminal in which the manager application is installed. In this specification, the CID is described as an example of the manager information, but the CID may be replaced with other types of manager information described above.

Afterward, the manager application 100 transmits the manager information to the server 300. When the server 300 registers the CID at a specific count, the manager application 100 receives setting data for specifying a virtual corporate card number generation function or a virtual corporate card number generation function from the server 300. In this way, the manager application 100 may include a virtual corporate card number generation function that generates an employee-specific virtual corporate card number for searching for a specific count at which the manager information is registered in the server 300.

On the other hand, in another embodiment, the manager application 100 may register the CID to the server 300. Afterward, the manager application 100 may additionally register at least one of a plurality of UIDs, a plurality of employee-specific virtual corporate card numbers, an actual corporate card number (or a corporate representative-specific virtual corporate card number), and a virtual corporate card number usage condition in the server 300. The manager application 100 may match and store the UID, the employee-specific virtual corporate card number, and the virtual corporate card number usage condition, which are received additionally. In this case, the UID, the employee-specific virtual corporate card number, and the virtual corporate card number usage condition may be stored after matching the storage location of the CID. The UID and employee-specific virtual corporate card number that are stored after matching the storage location of the CID may be used to verify the validity of the employee-specific virtual corporate card number thus received later. The virtual corporate card number usage condition may be used to restrict the usage range of the virtual corporate card. This will be described later.

In the meantime, when there is a request to generate an employee-specific virtual corporate card number, the manager application 100 may receive a corporate card usage condition from a manager. The received corporate card usage condition may be used in two different ways.

First, when there is a request to generate an employee-specific virtual corporate card number, the manager application 100 may receive the corporate card usage condition from the manager and may transmit the corporate card usage condition to the server 300. The server 300 matches the generated employee-specific virtual corporate card number with the corporate card usage condition and stores the matched result.

Second, the manager application 100 may allow the corporate card usage condition received from the manager to be included in the employee-specific virtual corporate card number. The server 300 extracts the corporate card usage condition from the received employee-specific virtual corporate card number and determines whether to approve a financial transaction request, under the extracted usage condition. In this case, the employee-specific virtual corporate card number may include a code (hereinafter, referred to as a "usage condition code") for defining a corporate card usage condition.

The employee application 200 receives and registers a virtual corporate card from the manager application 100, and processes financial transactions by using various payment methods based on the registered virtual corporate card.

In an embodiment, the employee application 200 may be activated through an employee authentication procedure. That is, an employee may install the employee application 200 in a user terminal, and the employee application 200 may be activated by certifying that the employee is an employee of the corresponding corporation. At this time, the employee authentication procedure may include an approval procedure of the manager application 100.

Besides, in another embodiment, the employee may apply for the issuance of an employee-specific virtual corporate card number to a corporate card manager through the employee application 200. That is, the employee application 200 may make a request for the issuance of the employee-specific virtual corporate card number to the manager application 100 or may make a request for the issuance of the employee-specific virtual corporate card number through an in-house system.

The employee application 200 receives the employee-specific virtual corporate card number generated by the manager application 100 from the manager application 100. When the employee application 200 transmits the received employee-specific virtual corporate card number to the server 300, the server 300 verifies the employee-specific virtual corporate card number, and stores the employee-specific virtual corporate card number in a storage area connected to the UID assigned to an employee, thereby registering a virtual corporate card. However, an embodiment is not limited thereto. For example, the use registration may be made by the manager application 100, or the use registration itself may not be made.

In the meantime, the UID is a value in a form of a unique code capable of identifying an employee by being assigned at a point in time when an employee installs the manager application 100, a point in time when a user is registered in the manager application 100, or a point in time when an employee is authenticated.

Here, the UID may be a type of employee information stored in the server 300 at a point in time when a user is registered in the manager application 100 or a point in time when an employee is authenticated. The employee information may be used as seed data when a virtual employee card number is generated by the employee application 200. The employee information may be at least one of a UID, a unique value of the employee application 200, or a terminal unique value in which the employee application 200 is installed. In this specification, the UID is described as an example of the employee information, but the UID may be replaced with other types of employee information described above.

Figure 12:
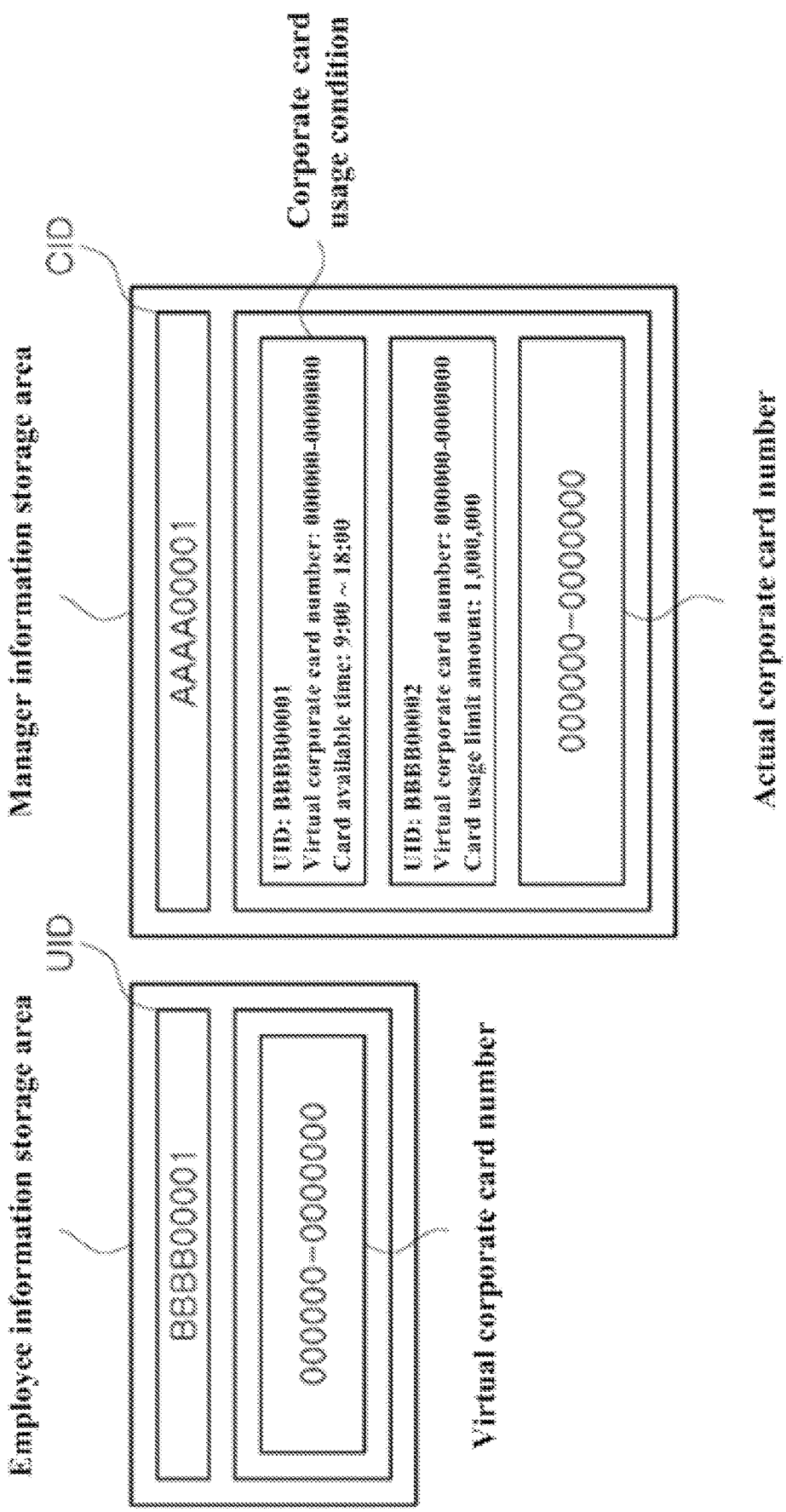
FIG. 12 is an exemplary diagram for describing a storage space of a server, according to an embodiment of the inventive concept.

The above-described manager information and employee information may be stored in different storage areas (hereinafter, referred to as "manager information storage area and employee information storage area") of the server 300. In detail, referring to FIG. 12, the CID may be stored in the manager information storage area. The UID, the employee-specific virtual corporate card number thus registered, and the corporate card number usage condition may be matched and stored in the storage location of CID. In the meantime, the UID may be stored in the employee information storage area. The employee-specific virtual corporate card number thus registered may be matched and stored in the storage location of the UID.

The storage location of manager information may be found by using only the employee-specific virtual corporate card number. The storage location of the employee information may be found by using only the virtual employee card number. An embodiment in which the server 300 searches for a storage location of manager information or a storage location of employee information by using an employee-specific virtual corporate card number or a virtual employee card number will be described later.

When a user is registered in the manager application 100 or an employee is authenticated, the employee application 200 receives setting data for specifying a virtual employee card number generation function or a virtual employee card number generation function from the server 300. In this way, the employee application 200 may include a virtual employee card number generation function to generate a virtual employee card number for searching for a specific count registered with UID in the server 300.

On the other hand, the card number registered through the employee application 200 is an employee-specific virtual corporate card number, not an actual corporate card number (or a representative-specific virtual corporate card number). In this way, security may be enhanced and unnecessary issuance of actual corporate card numbers may be reduced, thereby reducing the cost of card issuance. The detailed descriptions of the registration process and use process of a virtual corporate card of the employee application 200 will be described later.

In an embodiment, the employee application 200 may be a corporation-specific application. The corporation-specific application is an application provided by the server 300, and is an application capable of making financial transactions by using a corporate card. An employee may receive a UID by registering a user in the corporation-specific application provided from the server 300 and may register and use the employee-specific virtual corporate card number issued to the employee in a storage area connected to the corresponding UID.

In the meantime, a corporation-specific application is not limited to registering only the corporate card, and registers and uses an employee's personal card additionally. That is, an employee may register a plurality of cards including a corporate card and a personal card in a single application, and may select and use a card if necessary.

In another embodiment, the employee application 200 may be a personal card payment application. In other words, when the employee has a personal card payment application that has been previously used, the employee may additionally register and use the corporate card issued to the corresponding application. For example, for an employee to safely use his/her personal credit and debit card, when there is a variable virtual card number application by registering and using a fixed card number, the employee may identify that the employee is an employee of a corporation, to which the employee belongs, in the variable virtual card number application and may register the issued employee-specific virtual corporate card number.

The manager application 100 may be provided in a form installed or embedded in a manager's user terminal. The employee application 200 may be provided in a form installed or embedded in an employee's user terminal.

The payment server 300 may be a payment server operated by a financial company such as a card issuer issuing a corporate card, an oil refiner, or the like. Alternatively, the payment server 300 may include the payment server and a separate platform server operating in conjunction with the payment server.

In an embodiment, the payment server may verify the virtual employee card number and the employee-specific virtual corporate card number, may search for the actual corporate card number or a representative-specific virtual corporate card number by using the verified result, and may enable financial transactions to be made with the found actual corporate card number or representative-specific virtual corporate card number. In detail, it may be implemented in a form of adding a module, which verifies the virtual employee card number and the employee-specific virtual corporate card number and searches for an actual corporate card number, in front of a conventional system (i.e., a system that approves a payment by determining whether a card number is valid, based on an actual card number (Real PAN)) of a payment server.

In another embodiment, a platform server that operates in conjunction with the payment server may receive a virtual employee card number, may verify the received virtual employee card number, and may search for the virtual corporate card number where the server is stored, by using the verified virtual employee card number. In detail, in the case where the use of the virtual corporate card service for each employee through the service platform is agreed, when a specific corporation applies for using the virtual corporate card service for each employee, or when a financial company determines to provide the corresponding service to corporations, the platform server may receive and store an actual corporate card number itself from the payment server (i.e., a financial company server), and may receive and store a corporate representative-specific virtual corporate card number from the payment server.

For example, when receiving, storing and using a corporate representative-specific virtual corporate card number, the platform server may transmit, to the payment server, the corporate representative-specific virtual corporate card number found based on the virtual employee card number or the employee-specific virtual corporate card number. The payment server may search for the actual corporate card number stored after matching the received corporate representative-specific virtual corporate card number, and then may make financial transactions by using the found actual corporate card number. A corporate representative-specific virtual corporate card number may also include BIN for accessing a payment network. The platform server may transmit the corporate representative-specific virtual corporate card number to the payment server through a payment network. In this case, when issuing a corporate card, a financial company or an oil company such as a card issuer that issues a corporate card may transmit only the corporate representative-specific virtual corporate card number to the platform server, not the actual corporate card number. The platform server only stores the corporate representative-specific virtual corporate card number, not the actual corporate card number. Accordingly, even though data stored in the platform server is leaked, the actual corporate card number is not leaked, and thus security may be improved.

Moreover, for example, when the platform server stores and uses the actual corporate card number of each corporation, the platform server transmits the actual corporate card number found based on the virtual employee card number or employee-specific virtual corporate card number to the payment server through the payment network (i.e., a payment network corresponding to the BIN of the actual corporate card number), and the payment server directly makes a financial transaction (e.g., a payment) by using the received actual corporate card number.

As described above, a server that verifies the virtual employee card number and searches for the virtual corporate card number by using the virtual employee card number may be identical to a server that searches the actual corporate card number or the representative-specific virtual corporate card number by using the virtual corporate card number. Alternatively, a server that verifies the virtual employee card number and searches for the virtual corporate card number by using the virtual employee card number may be physically separated from a server that searches the actual corporate card number or the representative-specific virtual corporate card number by using the virtual corporate card number. In this specification, for convenience of description, the two different embodiments thus described above are not separately described. In this specification, descriptions of the server described may be applied to both one server and a plurality of servers that operate in conjunction with each other.

The server 300 processes the virtual corporate card usage registration process and payment process in conjunction with the manager application 100 or the employee application 200.

The server 300 issues an actual corporate card number or a representative-specific virtual corporate card number to a corporation making a request for the issuance of a corporate card and provides the manager application 100.

The server 300 sets an employee-specific virtual corporate card number generation condition for the manager application 100. The manager application 100 may generate a virtual corporate card number under the employee-specific virtual corporate card number generation condition set by the server 300. For example, under the employee-specific virtual corporate card number generation condition, the manager application 100 may generate a virtual corporate card number by using a virtual corporate card number generation algorithm assigned from the server 300.

Besides, the server 300 sets the virtual employee card number generation condition for the employee application 200. The employee application 200 may generate a virtual employee card number under the virtual employee card number generation condition set by the server 300. For example, under the virtual employee card number generation condition, the employee application 200 may generate a virtual employee card number by using the virtual employee card number generation algorithm given from the server 300.

The employee-specific virtual corporate card number and virtual employee card number include different identifier numbers (BINs). The server 300 may determine whether the received card number is an employee-specific virtual corporate card number or a virtual employee card number, through a BIN value included in the received card number. When the BIN value included in the received card number corresponds to the employee-specific virtual corporate card number, the server 300 searches for a manager information storage location corresponding to the received card number in a manager information storage area. In contrast, when the BIN value included in the received card number corresponds to the virtual employee card number, the server 300 searches for an employee information storage location corresponding to the received card number in an employee information storage area.

In an embodiment, when the server 300 is a payment server, the payment network transmits a card number (a fixed virtual employee card number and a variable virtual employee card number) including a specific BIN value to the payment server. The payment server searches for the actual corporate card number or representative-specific virtual corporate card number that matches the employee-specific virtual corporate card number, or searches for an employee-specific virtual corporate card number by using the virtual employee card number, and then searches for an actual corporate card number or a representative-specific virtual corporate card number by using the found result.

In another embodiment, the payment network transmits a card number (a fixed or variable virtual employee card number) including a specific BIN value to a platform server. The platform server verifies the virtual employee card number and searches for an employee-specific virtual corporate card number by using the virtual employee card number. Afterward, the platform server sends the found employee-specific virtual corporate card number to the payment server. Here, the virtual employee card number may be verified by a separate verification means.

As described above, the inventive concept makes a target, to which the payment network transmits the card number, different by using the BIN value included in the virtual card number.

The server 300 may perform a virtual corporate card usage registration process for registering and activating the virtual corporate card issued to an employee, in conjunction with the employee application 200.

As an embodiment of the virtual corporate card usage registration process, an employee card management module (not illustrated) for each corporation and a corporate card management module (not illustrated) may be used. That is, the virtual corporate card usage registration process may include a process in which an employee stores and registers an employee-specific virtual corporate card number in a storage area (hereinafter, an employee-specific storage area) connected to the UID assigned to himself/herself in an employee card management module for each corporation, and a process of determining the validity of whether the employee-specific virtual corporate card number registered through the employee card management module for each corporation in the corporate card management module is normally issued, and registering and activating the virtual corporate card number to be used.

The server 300 receives a virtual employee card number, searches for a storage location of the UID from a virtual employee card number, and extracts the employee-specific virtual corporate card number stored after matching the UID. Afterward, the server 300 searches for the storage location of the CID from the extracted employee-specific virtual corporate card number and extracts an actual corporate card number (or a representative-specific virtual corporate card number) stored after matching the CID. Afterward, a financial transaction may be made through the extracted actual corporate card number or representative-specific virtual corporate card number. Alternatively, a financial transaction may be made through the actual corporate card number matched to the representative-specific virtual corporate card number, by transmitting the representative-specific virtual corporate card number to the payment network.

In an embodiment, the server 300 extracts a corporate card usage condition that matches an employee-specific virtual corporate card number or the UID stored after matching the storage location of the CID and then may determine whether to make a payment, under the extracted corporate card usage condition.

In detail, the server 300 extracts the storage location of the CID from the employee-specific virtual corporate card number. The corporate card usage condition corresponding to the employee-specific virtual corporate card number and the employee-specific virtual corporate card number registered in the server 300 is matched and stored at the storage location of the CID The server 300 searches for the corporate card usage condition corresponding to the employee-specific virtual corporate card number used to extract CID from the storage location of the CID. Afterward, the server 300 determines whether to make a payment, under the found corporate card usage condition.

For example, in the case where the corporate card usage condition is set to a time range, only when a point in time when the virtual employee card number used to search for the employee-specific virtual corporate card number or the employee-specific virtual corporate card number is received within the time range, the server 300 makes a payment.

For example, in the case where the corporate card usage condition is set to a card expiration period, only when a point in time when the virtual employee card number used to search for the employee-specific virtual corporate card number or the employee-specific virtual corporate card number is received within the card expiration period, the server 300 makes a payment. In the meantime, when the expiration period of the employee-specific virtual corporate card number has expired, the server 300 may delete an employee-specific virtual corporate card number.

As another example, in the case where the corporate card usage condition is set to a limit amount, the server 300 deducts an approval request amount from the limit amount whenever a financial transaction request using the employee-specific virtual corporate card number is received, and the server 300 make a payment only when the approval request amount is greater than the remaining limit amount.

As another example, in the case where the corporate card usage condition is set to a usage count, the server 300 subtracts the usage count whenever a financial transaction request using the employee-specific virtual corporate card number is received, and the server 300 makes a payment only when the usage count is not zero.

In the meantime, the server 300 determines the validity of the virtual employee card number or employee-specific virtual corporate card number thus received. The validity determination method may vary depending on the type of the card number received by the server 300. This will be described later.

Figure 2:
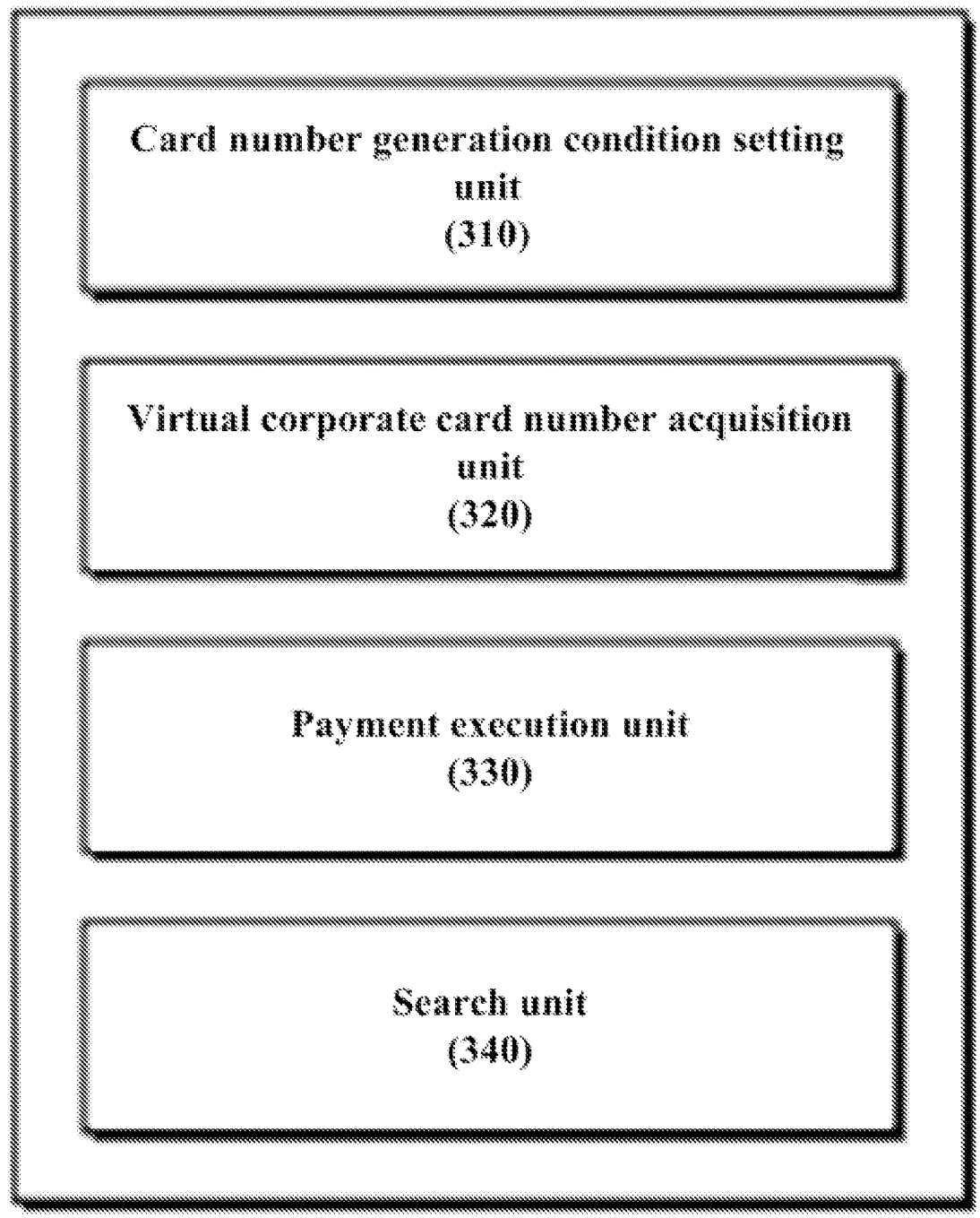
FIG. 2 is a block diagram of a server, according to an embodiment of the inventive concept.

FIG. 2 is a block diagram of the server 300, according to an embodiment of the inventive concept.

Referring to FIG. 2, according to an embodiment of the inventive concept, the server 300 may include a card number generation condition setting unit 310, a virtual corporate card number acquisition unit 320, a payment execution unit 330, and a search unit 340.

The card number generation condition setting unit 310 sets a card number generation condition for the manager application 100 or the employee application 200.

The manager application 100 generates an employee-specific virtual corporate card number under the employee-specific virtual corporate card number generation condition (e.g., a virtual corporate card number generation algorithm) set by the server 300. In addition, the server 300 may search for a storage location of CID by using the employee-specific virtual corporate card number. That is, the server 300 may search for the storage location of the CID based on the employee-specific virtual corporate card number, and then may store a representative-specific virtual corporate card number or actual corporate card number in a storage area (Hereinafter, a 'corporation-specific storage area') connected to the CID or may extract the representative-specific virtual corporate card number or actual corporate card number that has already been stored. The detailed description thereof will be described later.

In the meantime, the employee application 200 generates a virtual employee card number under the virtual employee card number generation condition (e.g., a virtual employee card number generation algorithm) set by the server 300. Furthermore, the server 300 may search for the storage location of the UID by using the virtual employee card number. That is, the server 300 may search for UID based on the virtual employee card number and may extract an employee-specific virtual corporate card number or a corporate card usage condition from the storage area (hereinafter, referred to as an 'employee-specific storage area') connected to the UID. The detailed description thereof will be described later.

The virtual corporate card number acquisition unit 320 obtains an employee-specific virtual corporate card number issued to an employee by the manager application 100.

When an employee requests an employee-specific virtual corporate card number, or when a manager requests to generate a virtual corporate card corresponding to a specific employee, the employee-specific virtual corporate card number is an employee-specific virtual corporate card number generated by the manager application 100. When an employee, which receives the employee-specific virtual corporate card number and registers the employee-specific virtual corporate card number, makes a request for making a payment, the virtual corporate card number acquisition unit 320 obtains the employee-specific virtual corporate card number.

A method in which the virtual corporate card number acquisition unit 320 obtains a virtual corporate card number varies depending on the type of payment means used by the employee. The method may be roughly divided into two methods.

The virtual corporate card number acquisition unit 320 may obtain a virtual corporate card number in two different ways. First, the server 300 receives the virtual employee card number, and searches the storage location of the UID from the received virtual employee card number. Afterward, the virtual corporate card number acquisition unit 320 obtains a virtual card number stored after matching the storage location of the UID. That is, the virtual corporate card number acquisition unit 320 may obtain a virtual card number by using the virtual employee card number.

Second, the virtual corporate card number acquisition unit 320 may directly receive an employee-specific virtual corporate card number. In detail, the employee application 200 may receive an employee-specific virtual corporate card number from the manager application 100 and may make a financial transaction request by using the employee-specific virtual corporate card number, or may request a financial transaction after registering the received employee-specific virtual corporate card number in an electronic wallet service being used. In this case, the virtual corporate card number acquisition unit 320 may receive an employee-specific virtual corporate card number from a POS terminal or may receive the employee-specific virtual corporate card number from an electronic wallet service server where the employee has registered the employee-specific virtual corporate card number.

The virtual corporate card number acquisition unit 320 may determine whether the card number obtained through the BIN included in the card number is a virtual corporate card number.

The payment execution unit 330 makes a payment with the actual corporate card number or representative-specific virtual corporate card number found based on the employee-specific virtual corporate card number obtained by the virtual corporate card number acquisition unit 320.

Furthermore, the payment execution unit 330 may extract the corporate card usage condition stored after matching the storage location of the CID or the corporate card usage condition included in the employee-specific virtual corporate card number, may verify the employee-specific virtual corporate card number, and may make a payment by using the actual corporate card number or representative-specific virtual corporate card number stored after matching the storage location of the CID, under the corporate card usage condition.

Afterward, the payment execution unit 330 determines whether to make a payment, under the found corporate card usage condition.

For example, in the case where the corporate card usage condition is set to a time range, only when a point in time when the virtual employee card number used to search for the employee-specific virtual corporate card number or the employee-specific virtual corporate card number is received within the time range, the payment execution unit 330 makes a payment.

For example, in the case where the corporate card usage condition is set to a card expiration period, only when a point in time when the virtual employee card number used to search for the employee-specific virtual corporate card number or the employee-specific virtual corporate card number is received within the card expiration period, the payment execution unit 330 makes a payment.

As another example, in the case where the corporate card usage condition is set to a limit amount, the payment execution unit 330 deducts an approval request amount from the limit amount whenever a financial transaction request using the employee-specific virtual corporate card number is received, and the payment execution unit 330 make a payment only when the approval request amount is greater than the remaining limit amount.

As another example, in the case where the corporate card usage condition is set to a usage count, the payment execution unit 330 subtracts the usage count whenever a financial transaction request using the employee-specific virtual corporate card number is received, and the payment execution unit 330 makes a payment only when the usage count is not zero.

In the meantime, the payment execution unit 330 may determine the validity of the employee-specific virtual corporate card number under the corporate card usage condition. When a point in time when the virtual employee card number or the employee-specific virtual corporate card number is received is within a time zone corresponding to time information about the use of the card, the payment execution unit 330 may determine that the card number is normal.

The search unit 340 searches the storage location of UID or CID by using the virtual employee card number or the employee-specific virtual corporate card number.

A part or all of components constituting the search unit 340 may be configured to be included in the payment execution unit 330.

Figure 3:
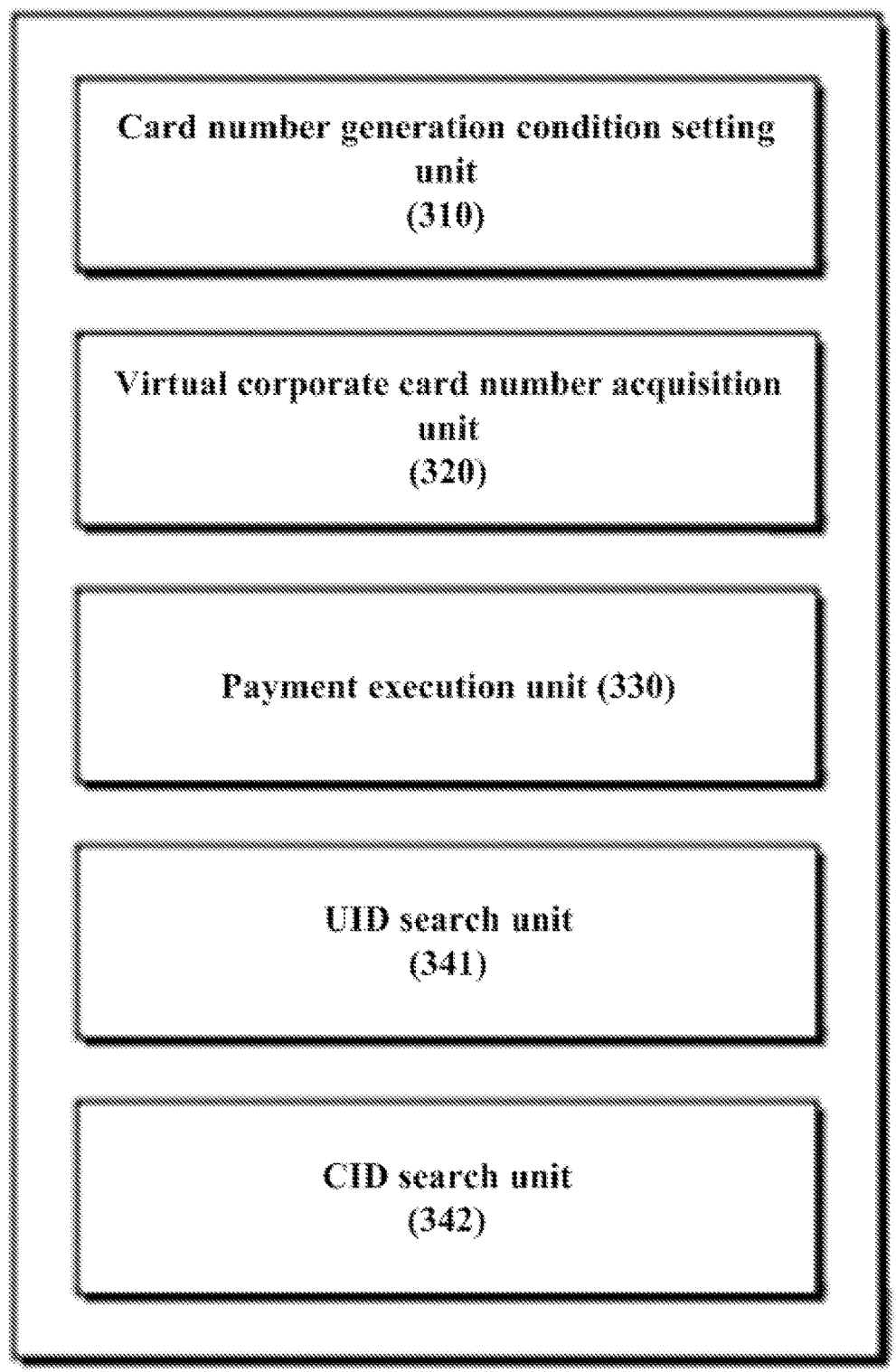
FIG. 3 is a block diagram of a server including a detailed configuration of a search unit, according to an embodiment of the inventive concept.

Referring to FIG. 3, the search unit 340 may include a UID search unit 341 for searching for UID and a CID search unit 342 for searching for CID.

The UID search unit 341 searches for UID assigned to an employee by using a virtual employee card number.

The server 300 may extract an employee-specific virtual corporate card number from the storage area (an employee-specific storage area) connected to the UID found by the UID search unit 341.

The CID search unit 342 searches for CID based on the employee-specific virtual corporate card number.

The server 300 may extract the employee-specific virtual corporate card number or actual corporate card number already stored in a storage area (a corporation-specific storage area) connected to the CID found by the CID search unit 342.

As a specific example, to verify the validity of the virtual corporate card number, the server 300 may determine whether a virtual corporate card number connected with UID found based on the virtual employee card number received from the employee application 200 is the same as an employee-specific virtual corporate card number extracted from a storage area (a corporation-specific storage area) connected to CID found based on the virtual corporate card number.

As another specific example, to make a payment, the server 300 may search for UID based on the virtual employee card number received from the employee application 200, may search for CID from the virtual card number connected with the UID, and may extract the actual corporate card number or representative-specific virtual corporate card number stored in the storage area (a corporation-specific storage area) connected to the corresponding CID.

To this end, the server 300 has a search algorithm for searching for the storage location of UID or CID. Each search algorithm (UID search algorithm or CID search algorithm) for searching for the storage location of the UID or CID may be partially or entirely the same as one another. Alternatively, different search algorithms may be applied. The server 300 may vary the search algorithm to be applied to a card number based on a BIN value included in the received card number. For example, when the card number includes the BIN value corresponding to a virtual corporate card, the server 300 searches for the storage location of the CID by applying the CID search algorithm. When the card number includes the BIN value corresponding to a virtual employee card, the server 300 searches for the storage location of the UID by applying the UID search algorithm.

Hereinafter, in descriptions commonly applied to the UID search algorithm and the CID search algorithm, the UID search algorithm or the CID search algorithm is referred to as a "search algorithm". In descriptions differently applied to the UID search algorithm and the CID search algorithm, the UID search algorithm or the CID search algorithm is used as it is.

As an embodiment of the search algorithm, the server 300 may search for the UID or CID based on a plurality of detailed codes constituting a virtual employee card number or an employee-specific virtual corporate card number. In this case, the server 300 has a correlation used when searching for a UID or CID, between a plurality of detailed codes. The server 300 searches for the UID or CID by performing calculation based on the correlation between the plurality of detailed codes. In detail, the server 300 extracts a plurality of detailed codes included in the received virtual employee card number or employee-specific virtual corporate card number. The server 300 searches for the UID or CID based on a plurality of detailed codes extracted through the search algorithm kept by the server 300. At this time, the search algorithm searches for the UID or CID by performing calculation based on the correlation between the plurality of detailed codes.

More specifically, the search algorithm included in the server 300 may search for the UID or CID by performing calculation (setting the search path) based on the correlation between the plurality of detailed codes from waypoints, via the waypoints corresponding to one or more detailed codes among a plurality of detailed codes. At this time, there are one or more waypoints. There is no limitation to the number and order of waypoints.

As a specific example of a plurality of detailed codes, the plurality of detailed codes may include the first code and the second code; the first code and the second code have a correlation used to search for the UID or CID. For example, the first code and the second code may be a code for the first corporation and a code for the second corporation included in the employee-specific virtual corporate card number; alternatively, the first code and the second code may be a first personal code and a second personal code included in the virtual employee card number.

Also, as another specific example, the virtual employee card number may be generated on the same principle as the employee-specific virtual corporate card number. That is, the virtual employee card number generation function generating a virtual employee card number may include a detailed code generation function included in the virtual corporate card number generation function generating the employee-specific virtual corporate card number, the detailed code generation function the same as the detailed code combination function, and the detailed code combination function.

In an embodiment, first code and second code have a correlation for the server 300 to search for a UID or CID. However, the manager application 100 may only include the first function to generate the first code and the second function to generate the second code through the detailed code generation functions to improve security, and may not include the data about the correlation between the first code and the second code.

In the meantime, each of the first code and the second code may play a role in the search process. The first code may include information about a waypoint. The second code may include information necessary for calculation capable of being reached from the waypoint to the storage location of the actual code. Specific examples of the first code and the second code will be described later with reference to FIG. 11.

Besides, in another embodiment, the payment server may further include a payment means registration unit (not illustrated). The payment means registration unit registers an offline payment means (e.g., an empty card, a wearable device, or the like) in the employee application 200.

In particular, the payment means registration unit may connect the offline payment means to the employee-specific storage area assigned to an employee, in conjunction with the employee card management module for each corporation. For example, the payment means registration unit may store and register an empty card number or identification number, which is assigned to the offline payment means, by matching the empty card number or identification number with an employee-specific virtual corporate card number registered in a corporation-specific employee card management module.

Figure 4:
FIG. 4 is a flowchart schematically illustrating a method of providing a financial transaction based on a virtual corporate card, according to an embodiment of the inventive concept.

FIG. 4 is a flowchart schematically illustrating a method of providing a financial transaction based on a virtual corporate card, according to an embodiment of the inventive concept.

Referring to FIG. 4, according to an embodiment of the inventive concept, a method for providing a virtual corporate card-based financial transaction may include step S500 of setting an employee-specific virtual corporate card number generation condition, step S700 of obtaining an employee-specific virtual corporate card number, and step S800 of making a payment.

In step S500, the server 300 sets the employee-specific virtual corporate card number generation condition for the manager application 100. The manager application 100 may generate an employee-specific virtual corporate card number used to search for an actual corporate card number (or a representative-specific virtual corporate card number) under the set generation condition.

In step S700, the server 300 obtains the employee-specific virtual corporate card number issued to an employee by the manager application 100. At this time, the employee-specific virtual corporate card number is generated by the manager application 100 at a point in time when the employee makes a request for the employee-specific virtual corporate card number.

In step S800, the server 300 makes a payment with the actual corporate card number or representative-specific virtual corporate card number found based on the employee-specific virtual corporate card number thus obtained. The detailed descriptions of a payment process will be described later with reference to FIG. 6.

Figure 5:
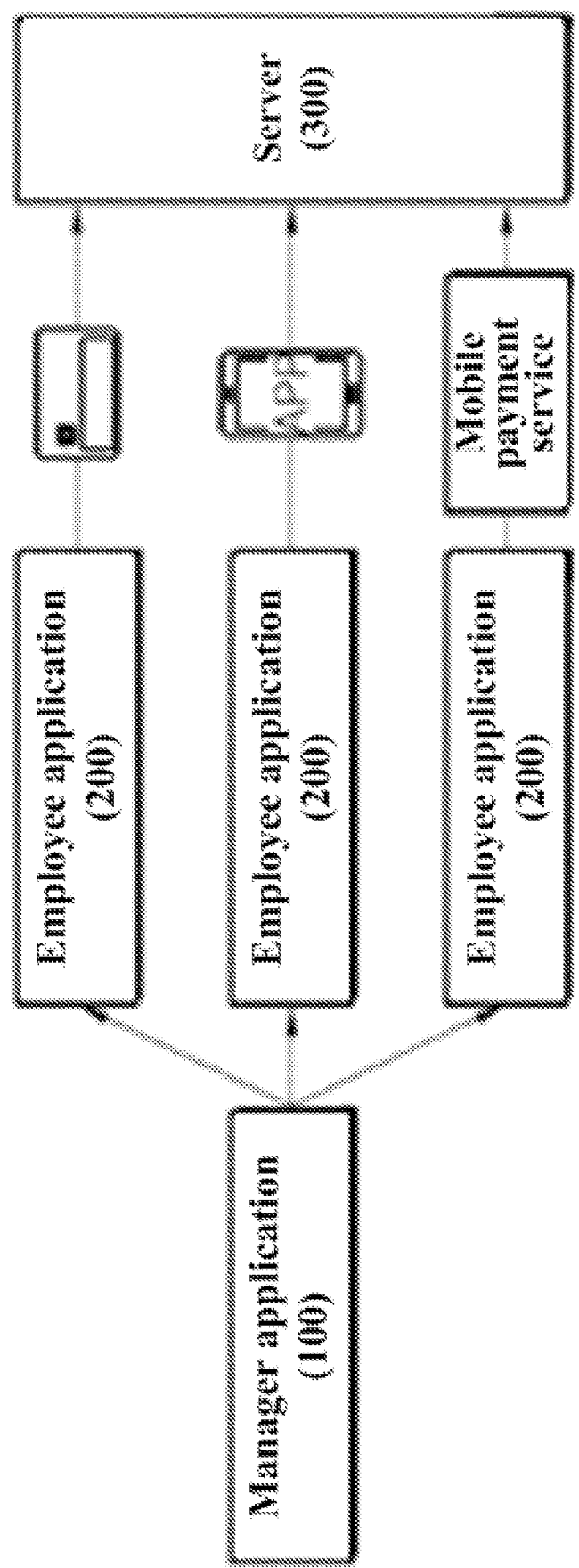
FIG. 5 is an exemplary view illustrating examples according to a payment means for a step of obtaining an employee-specific virtual corporate card number by a server, according to an embodiment of the inventive concept.

FIG. 5 is an exemplary view illustrating examples according to a payment means for a step of obtaining an employee-specific virtual corporate card number by the server 300, according to an embodiment of the inventive concept.

An employee may select and use a convenient payment means. Even though the employee uses any type of a payment means, an employee-specific virtual corporate card number issued to the employee is not exposed to the outside. Accordingly, CNP fraud using the employee-specific virtual corporate card number may be prevented from occurring In an embodiment, the employee may use a personal card payment application (e.g., a variable virtual card number application used by registering a fixed card number) that was previously used as a payment means. That is, the employee may register and use the employee-specific virtual corporate card number issued by using the personal card payment application thus previously used as the employee application 200.

In particular, the employee's personal card payment application generates a virtual employee card number matched with the employee-specific virtual corporate card number thus registered additionally. The employee's personal card payment application may request a payment with the employee-specific virtual corporate card number by providing the generated virtual employee card number to a payment terminal (e.g., transmitting a virtual employee card number to the payment terminal through NFC reading or QR code scanning upon making an offline payment).

In this case, the server 300 receives a virtual employee card number from a personal card payment application, and then extracts and obtains the employee-specific virtual corporate card number from the UID storage location found by the received virtual employee card number. At this time, the virtual employee card number is generated by a virtual employee card number generation function pre-stored in the personal card payment application 200, and is changed every unit time.

In the meantime, the virtual employee card number may include an identifier number (BIN). The identifier number (BIN) is used to identify whether the virtual employee card number received by the server 300 from the personal card payment application is a virtual employee card number for the employee's personal card, or a virtual employee card number for the virtual corporate card issued to the employee. As a specific example, the first six digits of the employee-specific virtual corporate card number may be composed of a specific identifier number (BIN) for each corporation. The server 300 may extract the first six digits of the virtual employee card number received from the personal card payment application, and then may identify whether the received virtual employee card number corresponds to an employee-specific virtual corporate card number, and which corporation issues the employee-specific virtual corporate card number.

In another embodiment, an employee may register and use separate physical payment means as a payment means.

The "physical payment means" is a device capable of making financial transactions and is a payment means incapable of directly generating a virtual card number. The physical payment means may be a payment means that receives code data capable of making financial transactions or code data matched with an actual card number and makes an offline payment based on short-range communication or an online payment in conjunction with a user terminal, but is not limited thereto.

As a specific example, the physical payment means may be an empty card of which the number is not printed on the surface thereof. In this case, the server 300 may store and register the corresponding empty card as a physical payment means capable of making a payment based on the employee-specific virtual corporate card number issued to the employee, by linking the empty card number or identification number assigned to the empty card to the employee-specific storage area assigned to the employee. The server 300 receives the first empty card number from the empty card, and extracts and obtains the employee-specific virtual corporate card number from the storage area found by the first empty card number. In this case, the first empty card number is a number stored in an empty card registered by an employee in the employee application 200 and is connected to a storage area where the employee-specific virtual corporate card number is stored.

In another embodiment, an employee may use a separate mobile payment service as payment means. That is, the employee may register the employee-specific virtual corporate card number in the mobile payment service, and may use a corporate card payment by using the mobile payment service as the employee application 200.

The "mobile payment service" is a service capable of purchasing products or services online and offline through a mobile device, and is a service capable of making a payment through a card registered in the mobile device without having a physical card by registering a fixed card number in the mobile device. For example, the mobile payment service includes, but is not limited to, a simple payment service such as Google Pay, Apple Pay, Samsung Pay, or the like.

In this case, when an employee registers an employee-specific virtual corporate card number in a mobile payment service, the employee-specific virtual corporate card number is stored in a token server (hereinafter, referred to as a "mobile payment service server") of a company providing the mobile payment service. In addition, a mobile payment service application of an employee makes a payment by using a virtual token matching the employee-specific virtual corporate card number. The employee may request a payment by using the employee-specific virtual corporate card number, by transmitting the virtual token to the payment terminal. In other words, in the case where an employee-specific virtual corporate card number is requested to be registered in a mobile payment service such as Apple Pay, Samsung Pay, or Google Pay, together with actual corporate card number, the employee-specific virtual corporate card number is normally registered in the mobile payment service server as a financial company approves the employee-specific virtual corporate card number as a normal card. When an employee uses a corporate card as a mobile payment service online/offline, the mobile payment service may make payment by using a virtual token (e.g., a virtual token, which is sent from a server to a user terminal and which is valid during a specific time) issued after matching the employee-specific virtual corporate card number.

In the meantime, the virtual token stored in the mobile payment service application may include an identifier number (BIN). The identifier number (BIN) is used to identify whether the virtual token received from the employee's mobile payment service application by the mobile payment service server is a virtual token corresponding to the employee's personal card, or whether the received virtual token is the virtual token corresponding to the virtual corporate card issued to the employee. When the result of determining the identifier number (BIN) included in the received virtual token indicates that the received virtual token corresponds to a virtual token corresponding to the employee-specific virtual corporate card number, the mobile payment service server searches for the employee-specific virtual corporate card number corresponding to the corresponding virtual token and transmits the employee-specific virtual corporate card number to the server 300.

Figure 6:
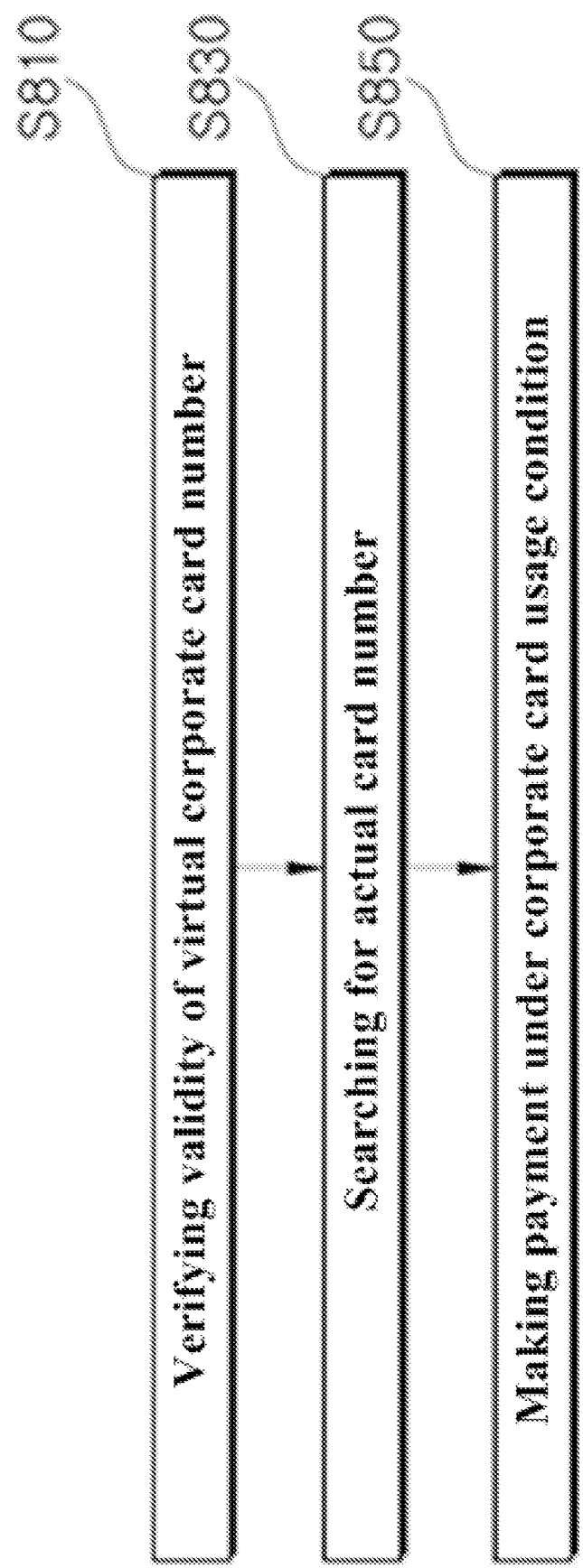
FIG. 6 is a flowchart schematically illustrating a detailed process of a payment execution step, according to an embodiment of the inventive concept.

FIG. 6 is a flowchart schematically illustrating a detailed process of a payment execution step, according to an embodiment of the inventive concept.

Referring to FIG. 6, according to an embodiment of the inventive concept, step S800 of making a payment may include step S810 of verifying the validity of an employee-specific virtual corporate card number, step S830 of searching for an actual card number, and step S850 of making a payment under a corporate card usage condition.

In step S810, the server 300 verifies the validity of the employee-specific virtual corporate card number obtained from the employee application 200.

The server 300 approves a payment by determining whether the obtained employee-specific virtual corporate card number is an employee-specific virtual corporate card number generated by the manager application 100.

In particular, the server 300 determines whether the employee-specific virtual corporate card number thus obtained is the same as the employee-specific virtual corporate card number stored in the storage area (a corporation-specific storage area in a corporate card management module) connected to the CID found by using the employee-specific virtual corporate card number. When the determination result indicates the employee-specific virtual corporate card number thus obtained is the same as the employee-specific virtual corporate card number thus stored, the server 300 extracts an actual corporate card number or a representative-specific virtual corporate card number stored in the corresponding CID and makes a payment.

In the meantime, step S830 is a step of making a payment under the corporate card usage condition extracted from the employee-specific virtual corporate card number or the corporate card usage condition stored after matching UID. The corporate card usage condition is replaced with details described above.

Figure 7:
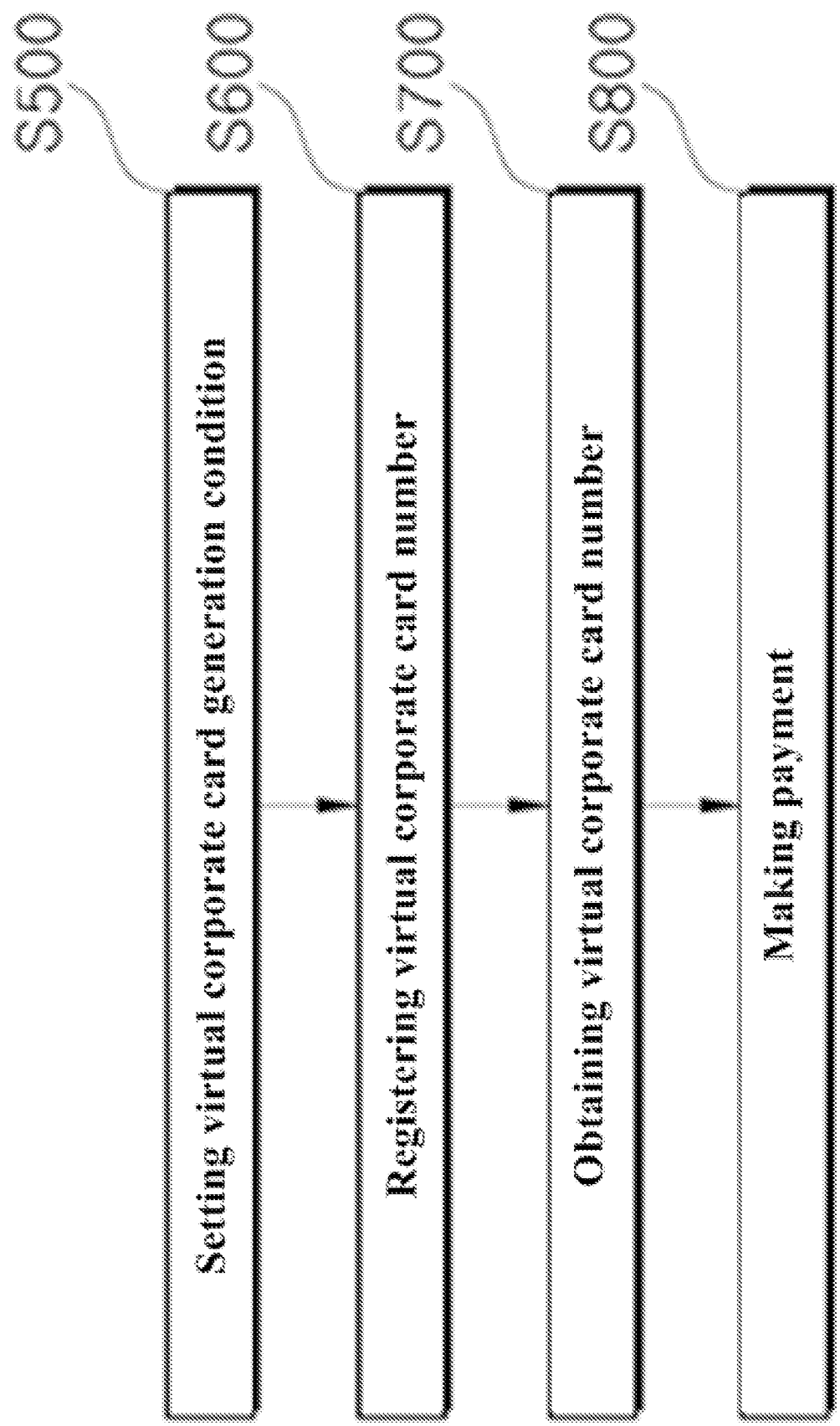
FIG. 7 is a flowchart illustrating a method of providing a financial transaction based on a virtual corporate card further including an employee-specific virtual corporate card number registration step, according to an embodiment of the inventive concept.

FIG. 7 is a flowchart illustrating a method of providing a financial transaction based on a virtual corporate card further including an employee-specific virtual corporate card number registration step, according to an embodiment of the inventive concept.

Referring to FIG. 7, according to an embodiment of the inventive concept, a method for providing a virtual corporate card-based financial transaction may further include step S600 of registering an employee-specific virtual corporate card number.

In step S600, the server 300 receives and registers the employee-specific virtual corporate card number from the manager application 100 or the employee application 200.

In an embodiment, the server 300 has only the search algorithm, and may not have a virtual corporate card number generation function. In this case, when the employee application 200 receives the employee-specific virtual corporate card number generated from the manager application 100 and transmits the employee-specific virtual corporate card number to the server 300, the server 300 verifies and registers the employee-specific virtual corporate card number by using the search algorithm.

In another embodiment, the server 300 and the manager application 100 may have the same virtual corporate card number generation function. That is, the server 300 stores and holds a virtual corporate card number generation function algorithm in CID for each corporation.

In this case, when the server 300 receives only seed data (e.g., time data, or the like) used to generate the employee-specific virtual corporate card number without the need to obtain the generated employee-specific virtual corporate card number, the server 300 may generate the same employee-specific virtual corporate card number by using the same virtual corporate card number generation function.

In another embodiment, the manager application 100 may transmit the employee-specific virtual corporate card number to the server 300 as well as the employee application 200. That is, the employee-specific virtual corporate card number may be stored and managed in the server 300 as well as the storage area connected to the UID assigned to an employee.

In another embodiment, upon registering an employee-specific virtual corporate card number, the server 300 receives a corporate card usage condition from the manager application 100, may match the corporate card usage condition with UID or the employee-specific virtual corporate card number, and may store the matched result.

Figure 8:
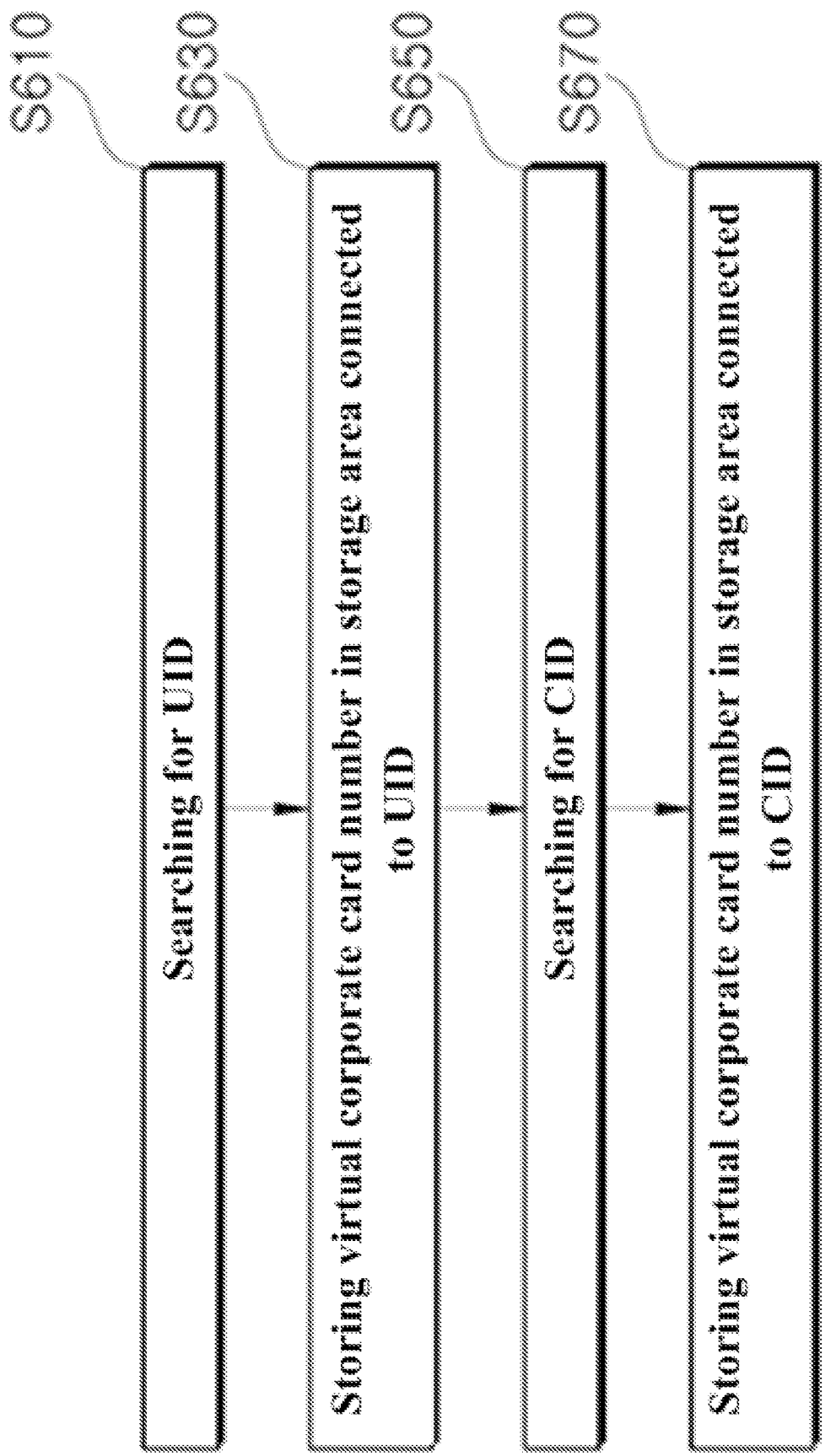
FIG. 8 is a flowchart schematically illustrating a detailed process of an employee-specific virtual corporate card number registration step, according to an embodiment of the inventive concept.

FIG. 8 is a flowchart schematically illustrating a detailed process of an employee-specific virtual corporate card number registration step, according to an embodiment of the inventive concept.

Step S600 of registering an employee-specific virtual corporate card number is a step of assigning an employee-specific virtual corporate card number to the employee application 200 and registering the employee-specific virtual corporate card number in the employee application 200.

Referring to FIG. 8, according to an embodiment of the inventive concept, step S600 of registering an employee-specific virtual corporate card number may include step S610 of searching for UID, step S630 of storing an employee-specific virtual corporate card number in a storage area connected to the UID, step S650 of searching for CID, step S670 of storing the employee-specific virtual corporate card number in the storage area connected to the CID, and step S690 of matching a corporate card usage condition with the employee-specific virtual corporate card number and storing the matched result in a storage area connected to the CID.

In step S610, the server 300 searches for UID assigned to an employee upon performing registration in the employee application 200. The details of an algorithm of searching for UID are the same as details described above, and thus are omitted to avoid redundancy.

In step S630, the server 300 stores an employee-specific virtual corporate card number received from the employee application 200 in a storage area connected to the found UID.

In step S650, the server 300 searches for CID assigned to a corporation based on the received employee-specific virtual corporate card number.

In step S670, the server 300 stores the received employee-specific virtual corporate card number in the storage area connected to the found CID.

In step S671, the server 300 stores a corporate card usage condition received from a manager application together with the employee-specific virtual corporate card number. Accordingly, the corporate card usage condition is stored in a manager information storage area.

The employee-specific virtual corporate card number is stored and managed in a storage area connected to the UID assigned to an employee and the CID assigned to a corporation, through step S610 to step S671.

In an embodiment, the server 300 may organize and provide a manager with a corporate card usage statement for each employee.

In particular, the server 300 matches the employee-specific virtual corporate card number with employee identification information and then stores and registers the matched result. Upon making a payment with the specified employee-specific virtual corporate card number, the server 300 may identify an employee who makes a request for making a payment based on employee identification information matched with the corresponding employee-specific virtual corporate card number. Accordingly, the manager of a corporation does not need to receive and manage receipts one by one from employees, and the server 300 may settle and provide a usage statement for each employee.

Figure 9:
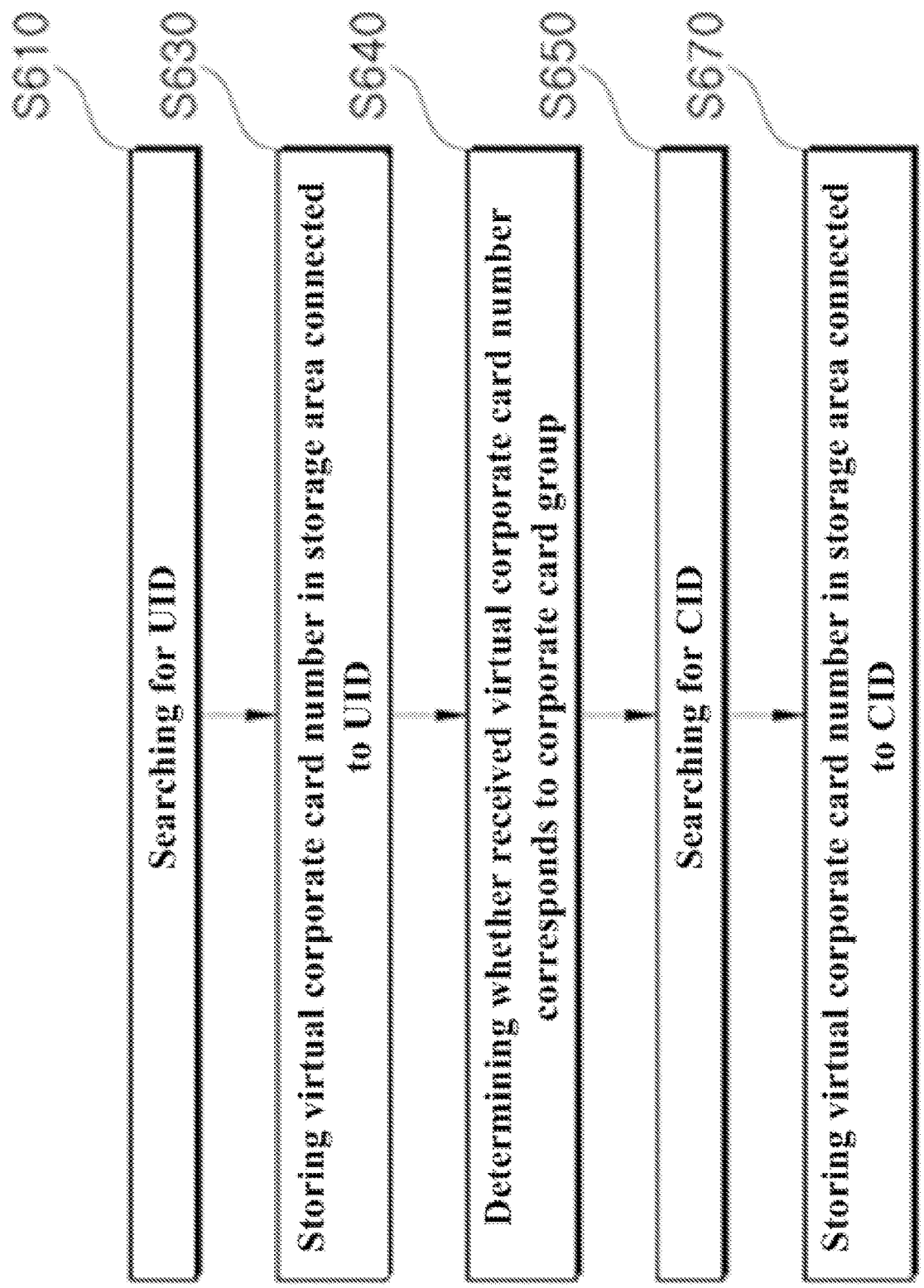
FIG. 9 is a flowchart illustrating a step of registering an employee-specific virtual corporate card number further including a step of identifying a corporate card group, according to an embodiment of the inventive concept.

FIG. 9 is a flowchart illustrating a step of registering an employee-specific virtual corporate card number further including step S640 of identifying a corporate card group, according to an embodiment of the inventive concept.

In step S640, the server 300 determines whether an employee-specific virtual corporate card number received from the employee application 200 corresponds to a corporate card group.

The "corporate card group" refers to a group to which cards (corporate cards) issued to a corporation, not cards (personal cards) issued to an individual, belong. That is, the determining of the corporate card group means determining whether a target card is a personal card or a corporate card.

In an embodiment of determining the corporate card group, the server 300 determines whether the received employee-specific virtual corporate card number corresponds to the corporate card group, based on the identifier number (BIN) included in the received employee-specific virtual corporate card number. That is, the employee-specific virtual corporate card number corresponding to the corporate card group includes a specific identifier number (BIN), and the server 300 has a group database including corporation information matched with the identifier number. When the identifier number (BIN) extracted from the received employee-specific virtual corporate card number is identified as the identifier number (BIN) assigned to the corporate card group, the server 300 proceeds with the employee-specific virtual corporate card number usage registration process.

Figure 10:
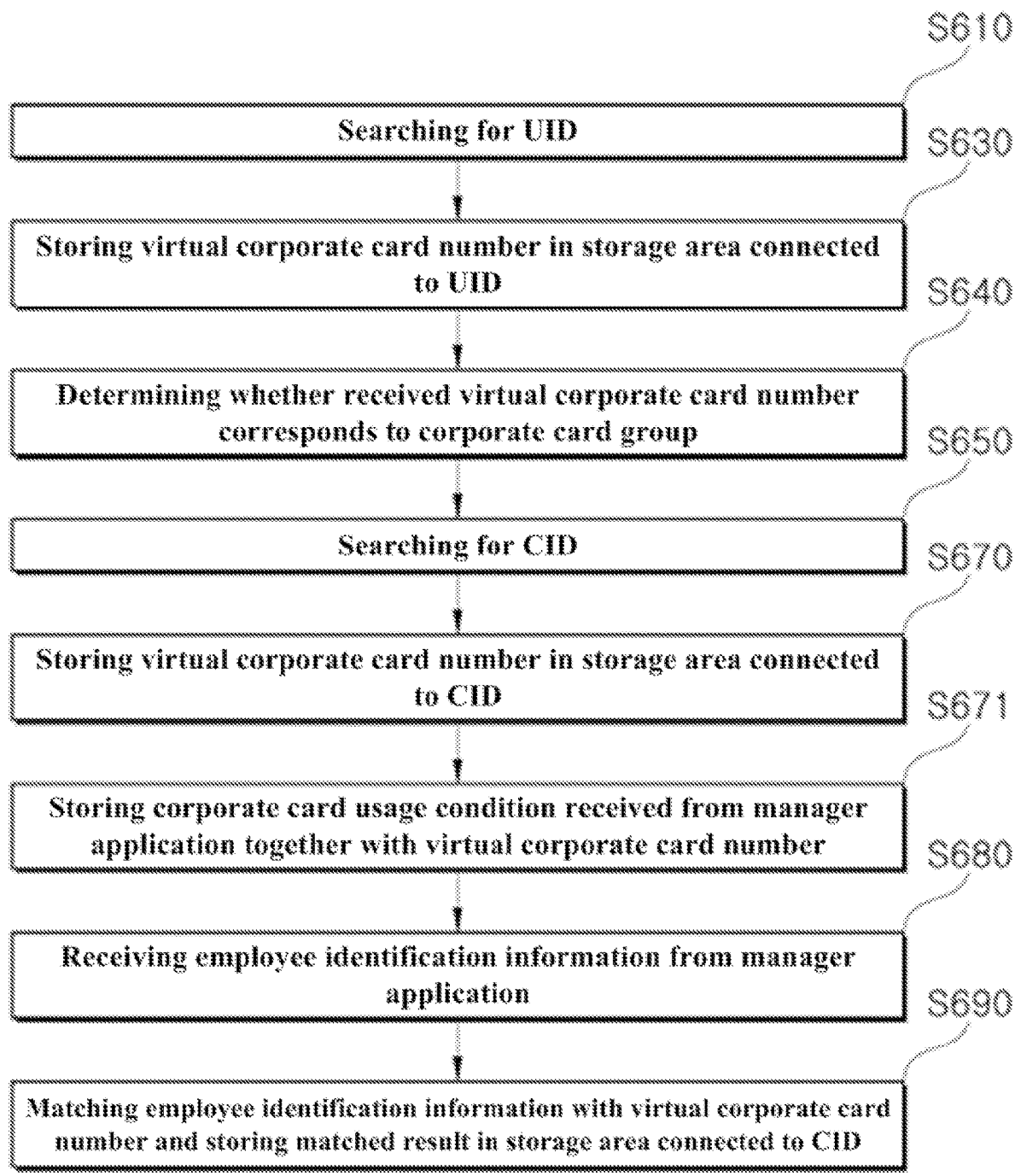
FIG. 10 is a flowchart illustrating an employee-specific virtual corporate card number registration step further including a step of receiving and storing employee identification information, according to an embodiment of the inventive concept.

FIG. 10 is a flowchart illustrating an employee-specific virtual corporate card number registration step further including a step of receiving and storing employee identification information, according to an embodiment of the inventive concept.

Referring to FIG. 10, as compared with FIG. 9, step S680 of receiving employee identification information from a manager application and step S690 of matching employee identification information with an employee-specific virtual corporate card number and storing the matched result in a storage area connected to a CID may be further included.

The employee using the employee-specific virtual corporate card number may be connected to the employee-specific virtual corporate card number by matching employee identification information with the employee-specific virtual corporate card number and storing the matched result. In this way, the server 300 may accurately calculate a payment amount of the corresponding corporation and may determine whether the payment is a normal payment of the corresponding corporation. Moreover, the corporate card manager of a corporation may automatically receive the payment amount of each employee and may manage a payment statement for each employee.

Figure 11:
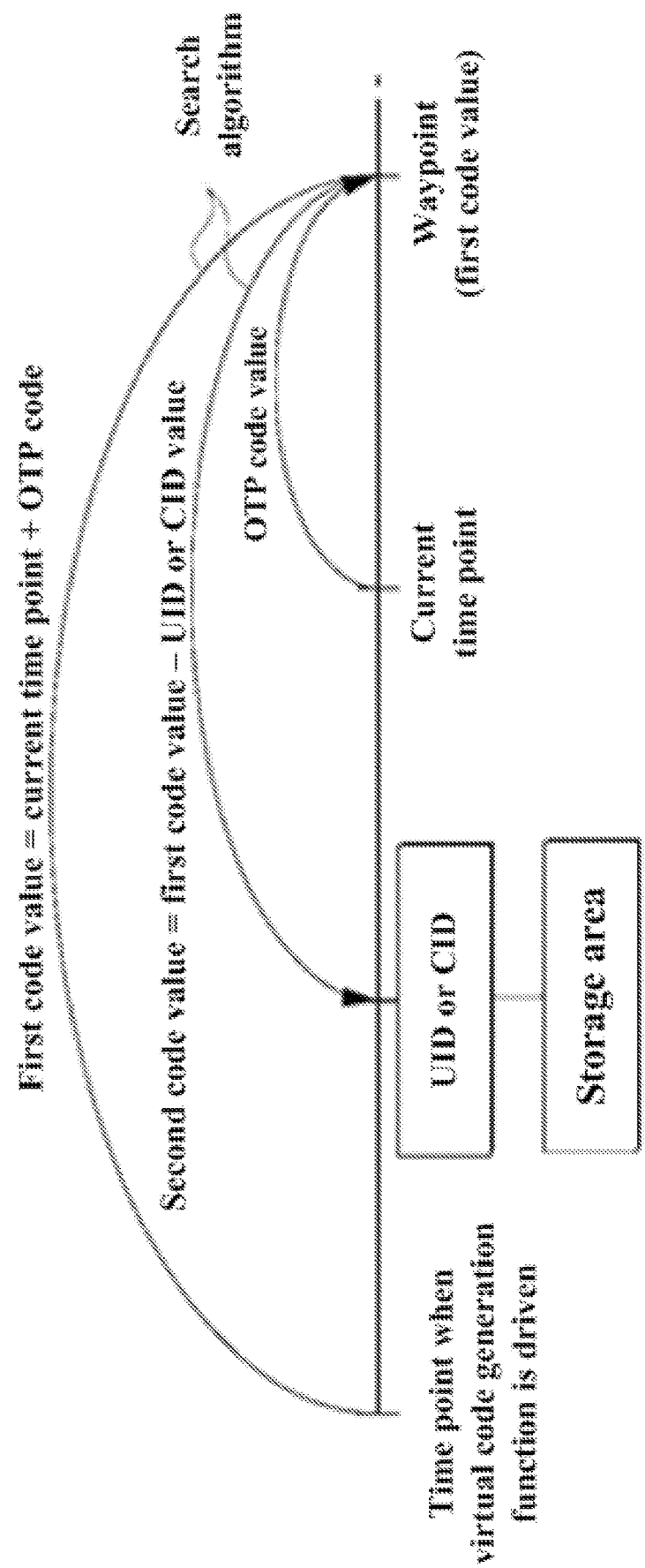
FIG. 11 is an exemplary diagram illustrating that a search algorithm is driven, according to an embodiment of the inventive concept.

FIG. 11 is an exemplary diagram illustrating that a search algorithm is driven, according to an embodiment of the inventive concept.

As described above, the server 300 has a search algorithm for searching for a UID or CID. Each search algorithm (UID search algorithm or CID search algorithm) for searching for the UID or CID may be partially or entirely the same as one another. Alternatively, different search algorithms may be applied.

Furthermore, as described above, the first code and the second code may be a code for the first corporation and a code for the second corporation included in the employee-specific virtual corporate card number, or may be a first personal code and a second personal code included in the virtual employee card number. Specific examples of the first code and the second code described later may be identically applied to each case.

As a specific example of the first code and the second code, a code value (a first code value) corresponding to the first code may be a value obtained by adding an OTP code value to a count corresponding to a current time point based on the point in time when a virtual corporate card number generation function is driven. The first code value operates as a waypoint in a search process. The code value (a second code value) corresponding to the second code may be a value obtained by subtracting a code value corresponding to the UID or CID from the first code value. The second code value is a count from a waypoint (first code value) to the code value corresponding to the UID or CID.

That is, an embodiment of the first code and second code generated by the manager application 100 or the employee application 200 is as follows.

First code=current time count+OTP code

Second code=first code−storage location value of UID or CID

The OTP code is a code generated by the OTP code generation function included in the detailed code generation function, and is a code generated differently every time point. Accordingly, the detailed code may be generated differently depending on a generation time point of the virtual code, thereby preventing the detailed code from being redundantly generated and enhancing security.

Meanwhile, the employee-specific virtual corporate card number may include a corporate card usage condition. In an embodiment, the employee-specific virtual corporate card number may include the first code, the second code, and time information. Here, the time information may include at least one of an expiration period of an employee-specific virtual corporate card number and data defining a period during which the employee-specific virtual corporate card number is capable of being used. Here, the time information may include at least one of the expiration period of the virtual corporate card number and data related to a period during which a corporate card is available during a day.

In another embodiment, the employee-specific virtual corporate card number may include a corporate card usage condition related to one of a usage limit amount and the available number of times.

The corporate card usage condition described above may be included in a separately allocated area in the employee-specific virtual corporate card number. The server 300 extracts the corporate card usage condition from the allocated area and then may determine whether to make a payment, based on the corporate card usage condition.

On the other hand, a virtual security code included in the first code and the second code may be formed as a count corresponding to a point in time when the employee-specific virtual corporate card number is capable of being used, not a point in time when the employee-specific virtual corporate card number is generated. In detail, an equation in which a dedicated program to generate a virtual corporate card number generates the first code and the second code are as follows.

First code=CID+OTP (a virtual security code based on a point in time when an employee-specific virtual corporate card number set by a manager is available)

Second code=OTP (a virtual security code based on a point in time when an employee-specific virtual corporate card number set by a manager is available)

When a request to generate an employee-specific virtual corporate card number is approved by a manager or an employee, the manager application 100 receives the employee-specific virtual corporate card number available time from the manager, or generates an employee-specific virtual corporate card number based on information about a card available time stored after matching the UID corresponding to an employee who has requested the generation of an employee-specific virtual corporate card number. Accordingly, the manager application 100 generates the first code and the second code based on the employee-specific virtual corporate card number.

The server 300 searches for a storage location of CID based on the first code and second code within the received employee-specific virtual corporate card number, generates a virtual security code (i.e., OTP number) within a specific count range from a point in time, at which a payment request is received, based on the storage location of the CID, and determines whether there is a code identical to the virtual security code extracted from the employee-specific virtual corporate card number among the generated virtual security codes. When there is a code identical to the virtual security code extracted from the employee-specific virtual corporate card number among the generated virtual security codes, the server 300 determines that the employee-specific virtual corporate card number is a correctly generated card number.

In the meantime, the employee-specific virtual corporate card number may include time information about the generation time of the employee-specific virtual corporate card number. In an embodiment, the employee-specific virtual corporate card number may include first to third codes. In detail, an equation in which the manager application 100 generates the first to third codes is as follows.

First code=generation time code (time-stamp)+OTP (a virtual security code based on a point in time when an employee-specific virtual corporate card number set by a manager is available)

Second code=first code−storage location of CID

Third code=generation time code (time-stamp)

When a request to generate an employee-specific virtual corporate card number is approved by a manager or an employee, the manager application 100 receives the employee-specific virtual corporate card number available time from the manager or generates a virtual security code based on information about a card available time stored after matching the UID corresponding to an employee who has requested the generation of an employee-specific virtual corporate card number. Accordingly, the manager application 100 generates first and third codes based on the generated virtual security code and data regarding a point in time when an employee-specific virtual corporate card number is generated. In the meantime, the manager application 100 generates the second code based on the generated first code and CID.

The server 300 searches for a storage location of CID based on the first code and second code within the received employee-specific virtual corporate card number or an employee-specific virtual corporate card number stored after matching the storage location of the UID, generates a virtual security code (i.e., OTP number) within a specific count range from a point in time, at which a payment request is received, based on the storage location of the CID, and determines whether there is a code identical to the virtual security code extracted from the employee-specific virtual corporate card number among the generated virtual security codes. Besides, the server 300 calculates data regarding employee-specific virtual corporate card number available time from the virtual security code and calculates a difference between the calculated time data and generation time data included in the third code. Only when a difference value is within a preset range, the server 300 determines that the employee-specific virtual corporate card number is normally generated. The scope may be set by the manager.

In this way, even when there is a difference between the generation of the employee-specific virtual corporate card number and the employee-specific virtual corporate card number available time, the inventive concept may determine whether the corresponding employee-specific virtual corporate card number is a normally generated code.

An employee-specific virtual corporate card number including a corporate card usage condition may be used without registering the employee-specific virtual corporate card number. The server 300 immediately searches for the storage location of the CID from the received employee-specific virtual corporate card number and extracts an actual corporate card number or a representative-specific virtual corporate card number. Afterward, the server 300 may determine make a payment, under the corporate card usage condition extracted from the employee-specific virtual corporate card number.

As illustrated in FIG. 11, the server 300 searches for a point matching the UID or CID by moving along a track in the direction set by the count corresponding to the second code value, via the count on the track matched with the first code value as the waypoint and searches for the storage area connected to the corresponding UID or CID.

Steps or operations of the method or algorithm described with regard to an embodiment of the inventive concept may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

According to an embodiment of the inventive concept, a corporation may issue a plurality of employee-specific virtual corporate card numbers matched with one actual corporate card number without the need to issue an actual corporate card number to each employee, thereby simplifying a process of issuing corporate cards to employees, and saving the cost of issuing physical cards.

Furthermore, according to an embodiment of the inventive concept, a manager may issue corporate cards in real time through a manager application and may set permissions (e.g., expiration date, usage limit, or the like), thereby managing corporate cards conveniently and quickly.

Moreover, according to an embodiment of the inventive concept, an employee may select a payment means (offline payment means such as general plastic cards, one-time virtual card number-based online/offline payment means, and conventional simple payment means such as Google Pay, or the like), which is convenient for the employee, to make a corporate card payment.

Also, according to an embodiment of the inventive concept, when the payment means selected by an employee is used, an employee-specific virtual corporate card number provided from a manager to the employee is not exposed directly, thereby preventing cardless transaction fraud caused by the leakage of the employee-specific virtual corporate card number.

Besides, according to an embodiment of the inventive concept, when an algorithm for generating a virtual code and searching for the code storage space for a payment is added, the conventional processes may be maintained as it is. For example, when a virtual code is generated and provided without duplication by an application providing a financial transaction service, a POS device and a PG server may transmit the virtual code to a server while being maintained as it is, and then the server may search for the storage area of a payment code corresponding to the virtual code to make a payment. As such, a portion to be changed in the conventional process may be minimized to increase security and a user does not need to perform an additional step to improve security.

Effects of the inventive concept are not limited to the effects mentioned above, and other effects not mentioned will be clearly understood by those skilled in the art from the following description.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

The invention claimed is:

1. A method for providing financial transaction based on a virtual corporate card, the method comprising:
  receiving, by a server, a card number including an identifier number that identifies whether the card number is an employee-specific virtual corporate card number or a virtual employee card number, and identifying, by the server, whether the received card number is the employee-specific virtual corporate card number or the virtual employee card number;
  when the received card number is the employee-specific virtual corporate card number, searching, by the server, for an employee-specific virtual corporate card number, which is stored in the server, wherein the employee-specific virtual corporate card number is generated by combining a plurality of detailed codes, by a virtual corporate card number generation function included in a manager application registered in the server;

searching, by the server, for a storage location of company identification (CID) based on the plurality of detailed codes constituting the employee-specific virtual corporate card number, wherein the plurality of detailed codes include a first code, a second code and a third code, and wherein the first code is generated by the manager application to be a sum of a time count at the time of generation and a one-time-password (OTP) code generated by an OTP code generation function included in the manager application, and the second code is generated by the manager application to be the first code minus a storage location value of CID, and wherein the third code includes a generation time code that corresponds to a point in time when the employee-specific virtual corporate card number is generated;

extracting, by the server, the CID from the storage location;

extracting, by the server, a corporate card usage condition, wherein the corporate card usage condition is stored in the server with matching information to the CID or is included in the employee-specific virtual corporate card number;

verifying, by the server, the employee-specific virtual corporate card number by performing:
generating, by the server, the OTP code within a specific count range from a point in time, at which a payment request is received, based on the storage location of the CID;
determining, by the server, whether the generated OTP code is identical to a virtual security code extracted from the employee-specific virtual corporate card number;
calculating, by the server, time data regarding an employee-specific virtual corporate card number-available time from the virtual security code, and a difference between the calculated time data and the generation time code included in the third code; and
determining, by the server, that the employee-specific virtual corporate card number is verified when the difference is within a preset range;

after the employee-specific virtual corporate card number is verified, extracting, by the server, an actual corporate card number or a corporate representative-specific virtual corporate card number, based on the CID, wherein the CID, the actual corporate card number, the corporate representative-specific virtual corporate card number, and the corporate card usage condition are stored in a manager information storage area of the server, the employee-specific virtual corporate card number is stored in an employee information storage area of the server, and the manager information storage area is separated from the employee information storage area;

making, by the server, a payment with the actual corporate card number or the corporate representative-specific virtual corporate card number, under the corporate card usage condition;

when the received card number is the virtual employee card number, which is generated by a virtual corporate card number generation function included in an employee application registered in the server, searching, by the server, for a storage location of user identification (UID) based on the virtual employee card number, wherein the UID is stored in the employee information storage area of the server; and making, by the server, the payment with the virtual employee card number.

2. The method of claim 1, further comprising:
receiving, by the server, another corporate card usage condition that is matched with the UID before the receiving of the employee-specific virtual corporate card number; and
matching and storing, by the server, the another corporate card usage condition with the UID.

3. The method of claim 2, wherein the making of the payment includes:
extracting, by the server, the corporate card usage condition stored after matching the UID, and
wherein the server determines whether to make the payment, under the corporate card usage condition.

4. The method of claim 3, wherein the corporate card usage condition includes information about a card available time, and
wherein the server makes the payment when a point in time when the virtual employee card number or the employee-specific virtual corporate card number is received is within the card available time.

5. The method of claim 1, wherein the corporate card usage condition is included in the employee-specific virtual corporate card number.

6. The method of claim 5, wherein, when the corporate card usage condition is extracted from the employee-specific virtual corporate card number, the server makes a payment under the extracted corporate card usage condition.

7. The method of claim 1, wherein the employee-specific virtual corporate card number includes a first identifier number, and the virtual employee card number includes a second identifier number that is different from the first identifier number, and
wherein the server searches for the storage location of the UID or the storage location of the CID by using a first search algorithm corresponding to the first identifier number when the employee-specific virtual corporate card number is received, and using a second search algorithm corresponding to the second identifier number when the virtual employee card number is received.

8. A non-transitory storage medium storing a program providing a financial transaction by using a virtual corporate card number, in combination with a computer hardware, the program including instructions to perform the method of claim 1.

9. The method of claim 1, wherein the making comprises:
makes the payment by using a virtual token that is matched with the employee-specific virtual corporate card number, by transmitting the virtual token to a payment terminal, wherein the virtual token is valid during a specific time.

10. A server for providing a financial transaction, the server comprising:
a virtual corporate card number acquisition unit configured to receive a card number including an identifier number that identifies whether the card number is an employee-specific virtual corporate card number or a virtual employee card number, and identify whether the received card number is the employee-specific virtual corporate card number or the virtual employee card number;
wherein the virtual corporate card number acquisition unit configured to, when the received card number is the employee-specific virtual corporate card number, search for the employee-specific virtual corporate card number, which is stored in the server, wherein the employee-specific virtual corporate card number is generated by combining a plurality of detailed codes, by a virtual corporate card number generation function included in a manager application registered in the server;

a search unit configured to search for a storage location of CID based on the plurality of detailed codes constituting the employee-specific virtual corporate card number, wherein the plurality of detailed codes include a first code, a second code, and a third code, and wherein the first code is generated by the manager application to be a sum of a time count at the time of generation and a one-time-password (OTP) code generated by an OTP code generation function included in the manager application, and the second code is generated by the manager application to be the first code minus a storage location value of CID, and wherein the third code includes a generation time code that corresponds to a point in time when the employee-specific virtual corporate card number is generated; and a payment execution unit configured to:

extracting the CID from the storage location;

extract a corporate card usage condition, wherein the corporate card usage condition is stored in the server with matching information to the CID or is included in the employee-specific virtual corporate card number;

verify the employee-specific virtual corporate card number by performing:
- generating the OTP code within a specific count range from a point in time, at which a payment request is received, based on the storage location of the CID;
- determining whether the generated OTP code is identical to a virtual security code extracted from the employee-specific virtual corporate card number;
- calculating time data regarding an employee-specific virtual corporate card number-available time from the virtual security code, and a difference between the calculated time data and the generation time code included in the third code; and
- determining that the employee-specific virtual corporate card number is verified when the difference is within a preset range;

after the employee-specific virtual corporate card number is verified, extracts an actual corporate card number or a corporate representative-specific virtual corporate card number, based on the CID, wherein the CID, the actual corporate card number, the corporate representative-specific virtual corporate card number, and the corporate card usage condition are stored in a manager information storage area of the server, the employee-specific virtual corporate card number is stored in an employee information storage area of the server, and the manager information storage area is separated from the employee information storage area; and make a payment with the actual corporate card number or the corporate representative-specific virtual corporate card number, under the corporate card usage condition;

wherein the virtual corporate card number acquisition unit configured to, when the received card number is the virtual employee card number, which is generated by a virtual corporate card number generation function included in an employee application registered in the server, search for a storage location of user identification (UID) based on the virtual employee card number, wherein the UID is stored in the employee information storage area of the server, and wherein the payment execution unit is configured to make the payment with the virtual employee card number.

11. The server of claim 10, wherein the server receives another corporate card usage condition that is matched with the UID, and matches and stores the another corporate card usage condition with the UID.

12. The server of claim 11, wherein the payment execution unit extracts the corporate card usage condition stored after matching the UID, and determines whether to make the payment, under the corporate card usage condition.

13. The server of claim 10, wherein the payment execution unit is further configured to make the payment by using a virtual token that is matched with the employee-specific virtual corporate card number, by transmitting the virtual token to a payment terminal, wherein the virtual token is valid during a specific time.

* * * * *